(12) United States Patent
Glugla et al.

(10) Patent No.: US 11,732,668 B1
(45) Date of Patent: Aug. 22, 2023

(54) SYSTEMS AND METHODS FOR CYLINDER MISFIRE DETECTION

(71) Applicant: Ford Global Technologies, LLC, Dearborn, MI (US)

(72) Inventors: Chris Paul Glugla, Macomb, MI (US); Rani Kiwan, Canton, MI (US); Robert Sarow Baskins, Grass Lake, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/650,431

(22) Filed: Feb. 9, 2022

(51) Int. Cl.
| | |
|---|---|
| *F02D 41/22* | (2006.01) |
| *F02B 75/22* | (2006.01) |
| *F02D 41/00* | (2006.01) |
| *G01M 15/11* | (2006.01) |
| *G01M 15/10* | (2006.01) |
| *F01N 13/10* | (2010.01) |
| *F02B 75/18* | (2006.01) |

(Continued)

(52) U.S. Cl.
CPC ........... *F02D 41/22* (2013.01); *F01N 13/107* (2013.01); *F02B 75/22* (2013.01); *F02D 41/009* (2013.01); *F02D 41/1443* (2013.01); *F02D 41/1498* (2013.01); *G01M 15/104* (2013.01); *G01M 15/11* (2013.01); *F02B 2075/1832* (2013.01); *F02D 2041/288* (2013.01); *F02D 2200/1015* (2013.01)

(58) Field of Classification Search
CPC ......... F02D 2200/1015; F02D 41/0082; F02D 41/009; F02D 41/1454–1456; F02D 41/1498; F02D 41/22; F01N 13/107; F02B 75/22; F02B 2075/1816; F02B 2075/1832; G01M 15/11
See application file for complete search history.

(56) References Cited

U.S. PATENT DOCUMENTS 4,793,135 A * 12/1988 Obstfelder ......... B01D 53/9454
60/276
6,289,672 B1 * 9/2001 Katoh ................. F02D 41/1443
60/276

(Continued)

FOREIGN PATENT DOCUMENTS

CN 110608097 A 12/2019
DE 102006009013 A1 * 8/2007 ............. F02D 13/06

(Continued)

*Primary Examiner* — John M Zaleskas
(74) *Attorney, Agent, or Firm* — Vincent Mastrogiacomo; McCoy Russell LLP

(57) ABSTRACT

Methods and systems are provided for detection of cylinder misfire in an engine. In one example, a system may comprise a first cylinder and second cylinder of the engine having exhaust flows combined together in an exhaust system before being combined with other cylinders of the engine. The first cylinder and second cylinder may share an exhaust gas sensor mounted in the exhaust in a position to sense exhaust from the first cylinder and second cylinder, and being positioned before exhaust from other cylinders is combined with sensed exhaust from the first cylinder and second cylinder. The system may further include a control system with instructions stored therein to indicate detected misfire in one or more of the first and second sensors based on an output from the exhaust gas sensor.

20 Claims, 9 Drawing Sheets

(51) Int. Cl.
*F02D 41/14* (2006.01)
*F02D 41/28* (2006.01)

(56) References Cited

U.S. PATENT DOCUMENTS

| | | | | |
|---|---|---|---|---|
| 6,497,228 | B1* | 12/2002 | Booth | F02D 41/1498 |
| | | | | 123/692 |
| 6,550,466 | B1* | 4/2003 | Behr | F02D 41/1443 |
| | | | | 123/691 |
| 10,161,326 | B2 | 12/2018 | Glugla et al. | |
| 10,215,115 | B1* | 2/2019 | Ranga | F02D 41/0002 |
| 10,385,787 | B2* | 8/2019 | Kopecek | F02D 41/0087 |
| 2003/0172647 | A1* | 9/2003 | Tanaka | F01N 3/0885 |
| | | | | 60/288 |
| 2003/0221416 | A1* | 12/2003 | Ingram | F02P 5/1506 |
| | | | | 60/284 |
| 2005/0145233 | A1* | 7/2005 | Schneider | F02D 41/1498 |
| | | | | 123/690 |
| 2005/0193721 | A1* | 9/2005 | Surnilla | F01N 13/009 |
| | | | | 60/285 |
| 2005/0247277 | A1* | 11/2005 | Ohtsuka | F02D 35/023 |
| | | | | 123/90.16 |
| 2006/0112932 | A1* | 6/2006 | Toyoda | F02D 41/1498 |
| | | | | 123/690 |
| 2007/0078587 | A1* | 4/2007 | Beer | F02D 41/1498 |
| | | | | 73/114.73 |
| 2007/0289295 | A1* | 12/2007 | Miyashita | F02D 41/1498 |
| | | | | 60/300 |
| 2009/0037079 | A1* | 2/2009 | Suzuki | F02D 41/008 |
| | | | | 123/703 |
| 2009/0241925 | A1* | 10/2009 | Behr | F02D 41/0082 |
| | | | | 123/690 |
| 2010/0082297 | A1* | 4/2010 | Turin | F02D 41/0085 |
| | | | | 73/114.73 |
| 2012/0253642 | A1* | 10/2012 | Kitano | F02D 41/1441 |
| | | | | 701/104 |
| 2013/0184969 | A1* | 7/2013 | Rollinger | F02D 41/2458 |
| | | | | 701/103 |
| 2014/0202426 | A1* | 7/2014 | Surnilla | F02D 17/02 |
| | | | | 123/349 |
| 2014/0261309 | A1* | 9/2014 | Chen | F02D 17/00 |
| | | | | 123/320 |
| 2014/0352659 | A1* | 12/2014 | Glugla | F02D 35/028 |
| | | | | 123/350 |
| 2015/0075508 | A1* | 3/2015 | Wada | G01M 15/11 |
| | | | | 123/704 |
| 2015/0167573 | A1* | 6/2015 | Glugla | F02D 35/027 |
| | | | | 701/111 |
| 2016/0258375 | A1* | 9/2016 | Jammoussi | F02D 41/1454 |
| 2016/0333807 | A1* | 11/2016 | Pathan | G01M 15/11 |
| 2017/0314481 | A1* | 11/2017 | Karunaratne | F02M 26/43 |
| 2017/0350333 | A1* | 12/2017 | Glugla | F02D 35/0015 |
| 2019/0353132 | A1* | 11/2019 | Hakeem | F01L 13/0005 |
| 2020/0102900 | A1* | 4/2020 | Kolhouse | F02M 26/43 |
| 2021/0003088 | A1* | 1/2021 | Chen | F02B 9/04 |
| 2021/0364390 | A1* | 11/2021 | Herrnberger | F02D 41/1454 |

FOREIGN PATENT DOCUMENTS

| | | | | |
|---|---|---|---|---|
| FR | 2858019 A1 * | 1/2005 | | F01N 11/00 |
| JP | 2001323839 A | 11/2001 | | |
| JP | 5575319 B1 | 8/2014 | | |

* cited by examiner

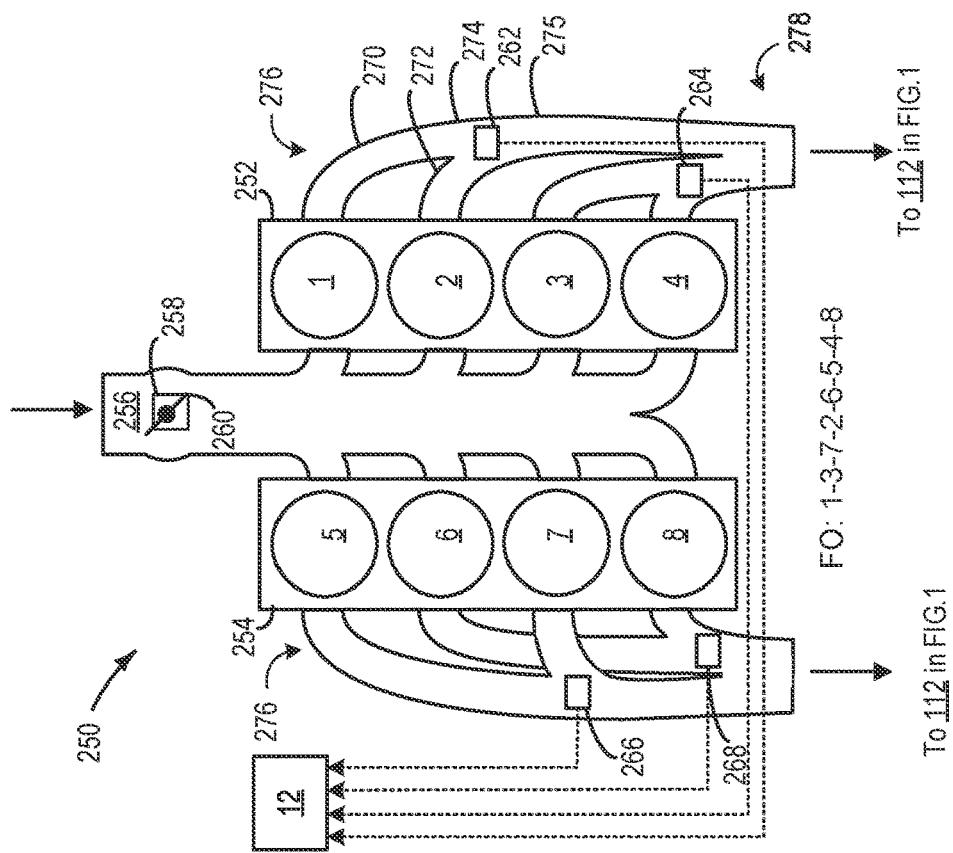
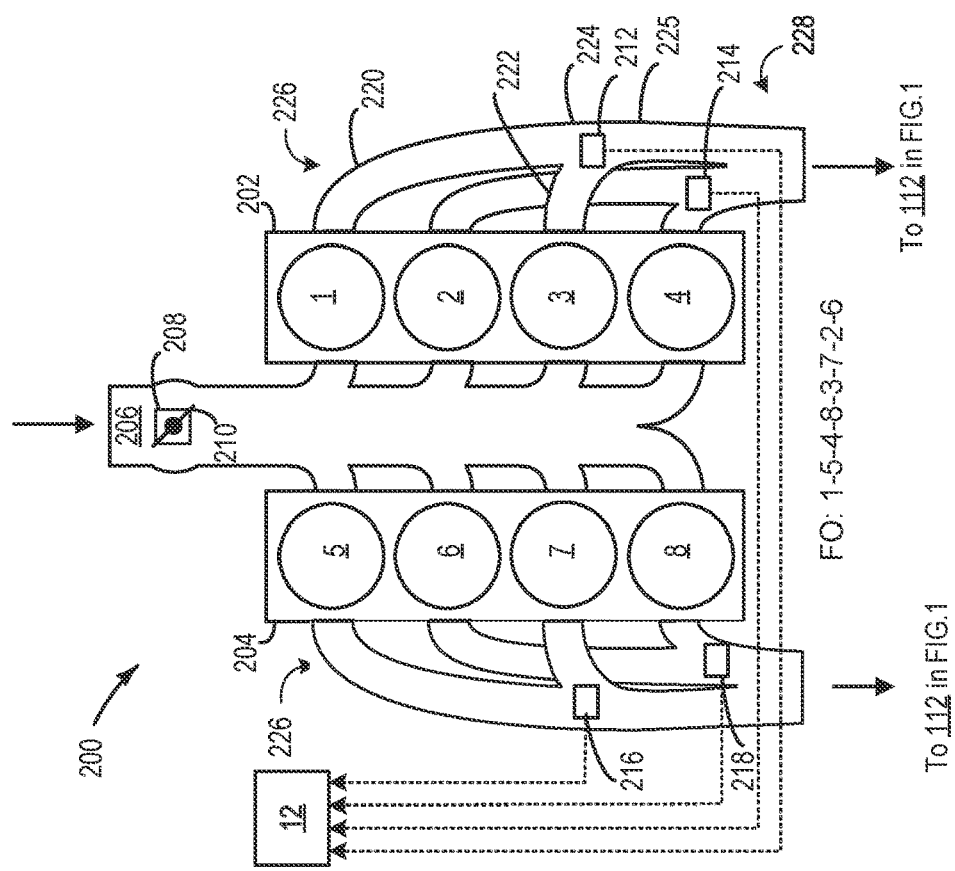
FIG. 2A
FIG. 2B

SYSTEMS AND METHODS FOR CYLINDER MISFIRE DETECTION

FIELD

The present description relates generally to systems and methods for detecting cylinder misfire in a vehicle engine.

BACKGROUND/SUMMARY

Individual engine cylinders may undergo a misfire event wherein a combustion event does not occur as intended. For engines with multiple cylinder banks, there may be conditions where every cylinder in a given bank misfires, resulting in a cylinder bank misfire. Engine control systems may include misfire detection modules for identifying such misfire events. As an example, engine misfire can be identified based on fluctuations in the crankshaft torsional vibration as detected by a crankshaft acceleration sensor.

However, the inventors herein have recognized potential issues with such detection methods that rely on a crankshaft acceleration sensor. By detecting misfire based on crankshaft acceleration sensor response, erroneous detection may take place. For example, under some conditions, a high number of cylinders (e.g., V-8, V-10, V-12) may make misfire detection more difficult due to less time between torque input pulses to the crankshaft. As one example, high engine speed and light load may make detection challenging due to the small torque input pulses from light load, and the shorter interval between firing events. Furthermore, paired misfires (e.g., cylinders fired 360° apart) may also be difficult to detect and especially challenging to detect the specific cylinder that misfired. Even adding additional sensor information, such as from an exhaust oxygen sensor, may still be insufficient due to exhaust mixing and variation in exhaust flow dynamics.

As one example, the inventors have identified a solution in which exhaust gas oxygen sensors, such as UEGO sensors, are provided for paired cylinders, the paired cylinders having their exhaust combined with each other before being combined with any other cylinder's exhaust. In one example, the issues described above may be addressed by a system for an engine, comprising: a first cylinder and second cylinder of the engine having exhaust flows combined together in an exhaust system before being combined with other cylinders of the engine; an exhaust gas sensor mounted in the exhaust in a position to sense exhaust from the first cylinder and second cylinder, and being positioned before exhaust from other cylinders is combined with sensed exhaust from the first cylinder and second cylinder; and a control system with instructions stored therein to indicate detected misfire in one or more of the first and second cylinders based on an output from the exhaust gas sensor. In this way, cylinder misfire detection may be carried out more reliably on engines with many cylinders during a variety of load and speed conditions.

As one example, the control system may include instructions to detect misfire of one or more of the first cylinder and the second cylinder based on a magnitude of the output of the exhaust gas sensor, and then identify which of the first cylinder and the second cylinder is misfiring based on a phase of the output of the exhaust gas sensor relative to a firing order of the engine. The system may further include a third cylinder and a fourth cylinder of the engine having exhaust flows combined together in the exhaust system before being combined with other cylinders of the engine. The third and fourth cylinder may share a second exhaust gas sensor mounted in the exhaust in a second position to sense exhaust. The second sensor may be positioned before exhaust from other cylinders is combined with exhaust from the third and fourth cylinder. The control system may detect misfire of one or more of the third cylinder and the fourth cylinder based on magnitude of the output of the second exhaust gas sensor, and then identify which of the third cylinder and fourth cylinder is misfiring based on a phase of the output of the second exhaust gas sensor relative to the firing order of the engine. The control system may then include further instructions to detect opposite paired cylinder misfire of exactly two cylinders of the first cylinder, second cylinder, third cylinder, and fourth cylinder based on the output of the exhaust gas sensor and the output of the second exhaust gas sensor. In this way, the strength of an exhaust gas sensor output signal is increased and identification of individual misfiring cylinders and paired misfiring cylinders is achieved.

In this way, by relying on the output of exhaust gas oxygen sensors observing two cylinders, where sensors are arranged to provide separation between exhaust pulses and increase observability, and the confluence point of the exhaust is downstream of the sensor locations, the error signal strength is increased. Furthermore, with increased sample strength and sampling speed, it is possible to see blowdown pulses from a firing cylinder and lean spikes from a misfiring cylinder. By understanding the transport delay time from the exhaust valve opening to the sensor, it is possible to identify which of the two cylinders is misfiring. Based on the output of the sensors and known firing order, paired misfire can be detected with cylinder identification even when located on separate cylinder banks on V-engines. Paired cylinder misfire and single cylinder misfire conditions may be identified and flagged with specific indications, for example, providing valuable diagnostic information for a technician and/or operator. One skilled in the art will also recognize the signal and observability will be further increased if one sensor per cylinder were implemented, however one sensor per two cylinders represents a good balance of signal strength as well as lower cost. The technical effect of a system and method for detecting a misfire based on grouped exhaust gas oxygen sensors and a known engine firing order is that misfire detection accuracy is increased and engine cylinders may be held active for a longer duration.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A is an example embodiment of an exhaust manifold and sensor configuration for an engine system, particularly a flat-plane crank V-8 engine.

FIG. 2B is an example embodiment of an exhaust manifold and sensor configuration for an engine system, particularly for a cross-plane crank V-8 engine

DETAILED DESCRIPTION

Figure 1:
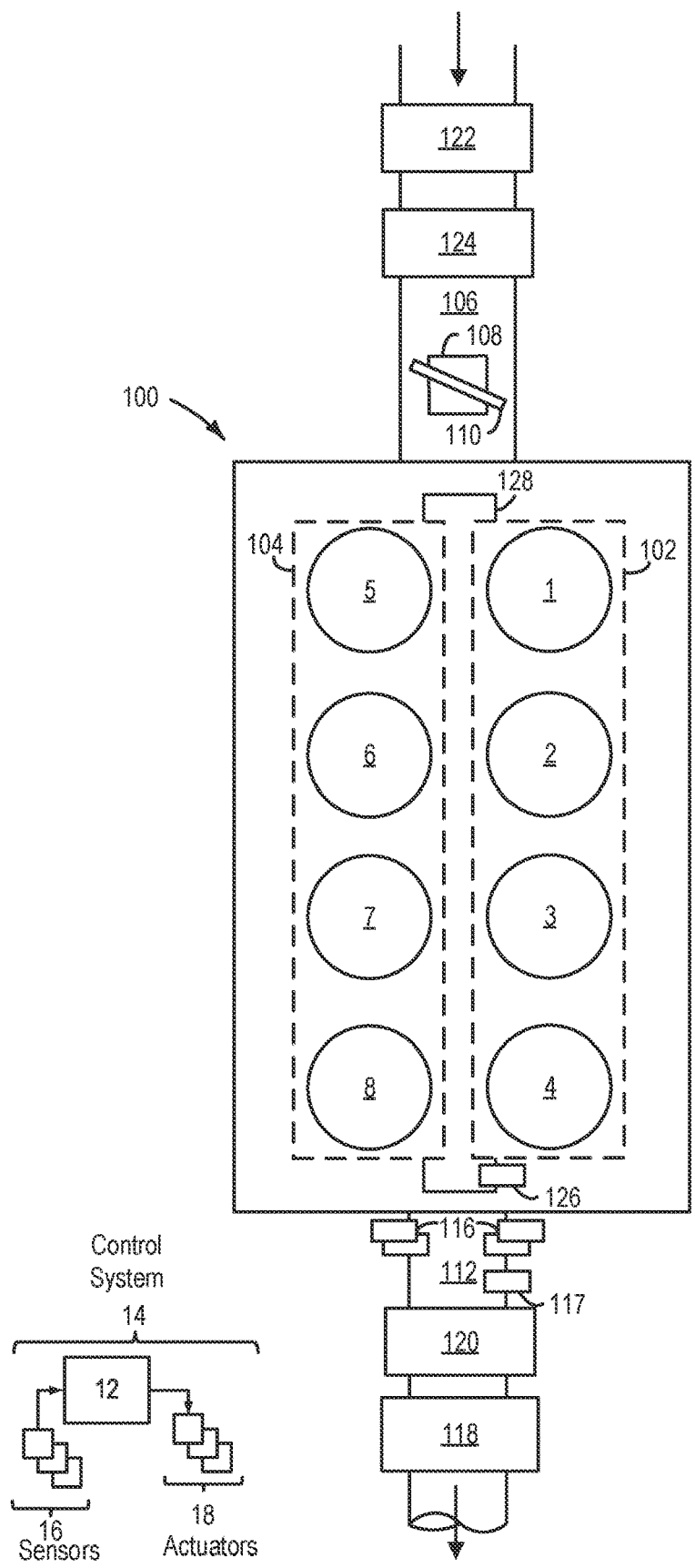
FIG. 1 is an example embodiment of an engine system including two cylinder banks.
Figure 4A:
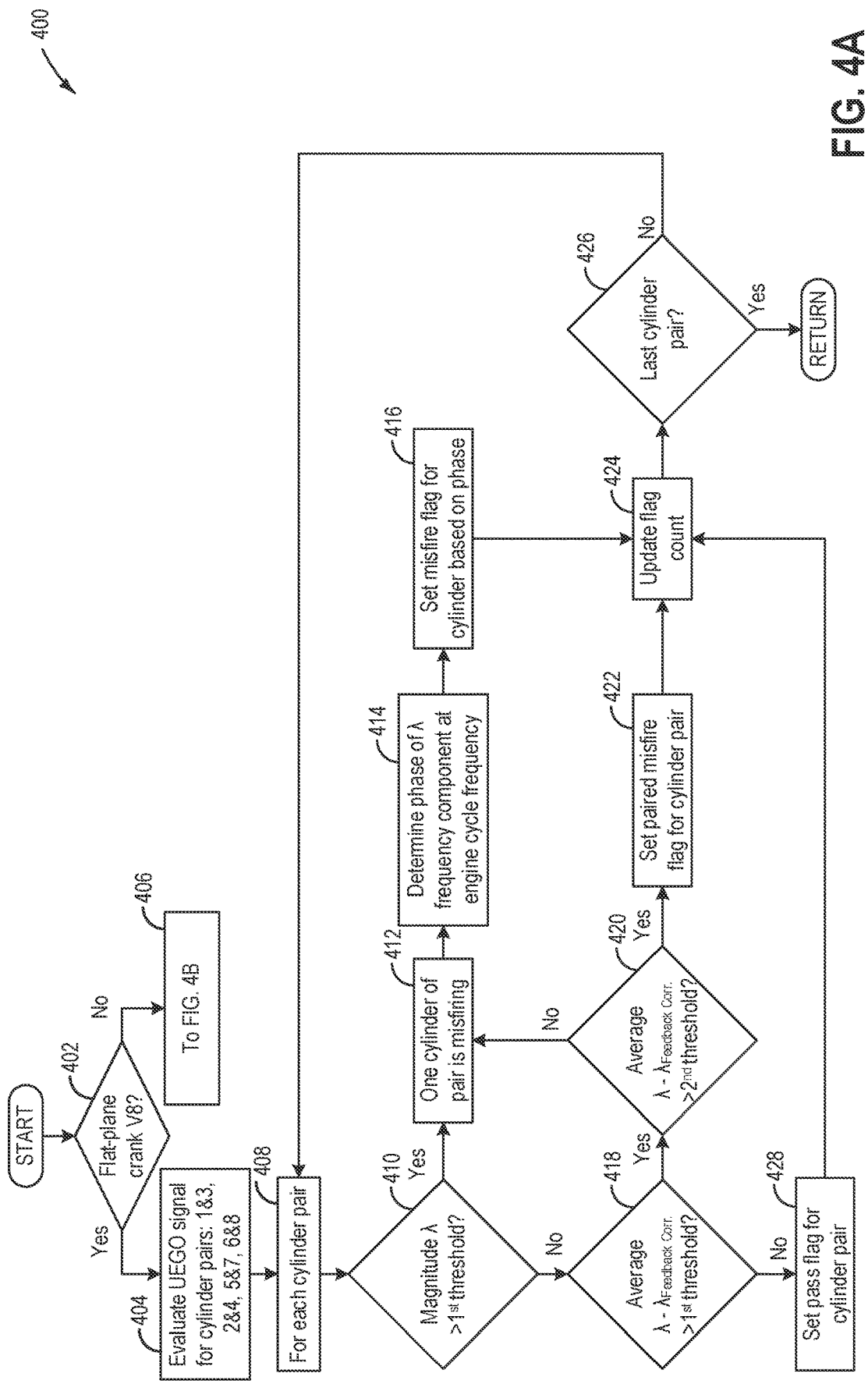
FIG. 4A is a flow chart illustrating an example cylinder misfire detection test that may be implemented in an engine system including a flat-plane crank V-8 engine, such as engine 200 of FIG. 2A.
Figure 4B:
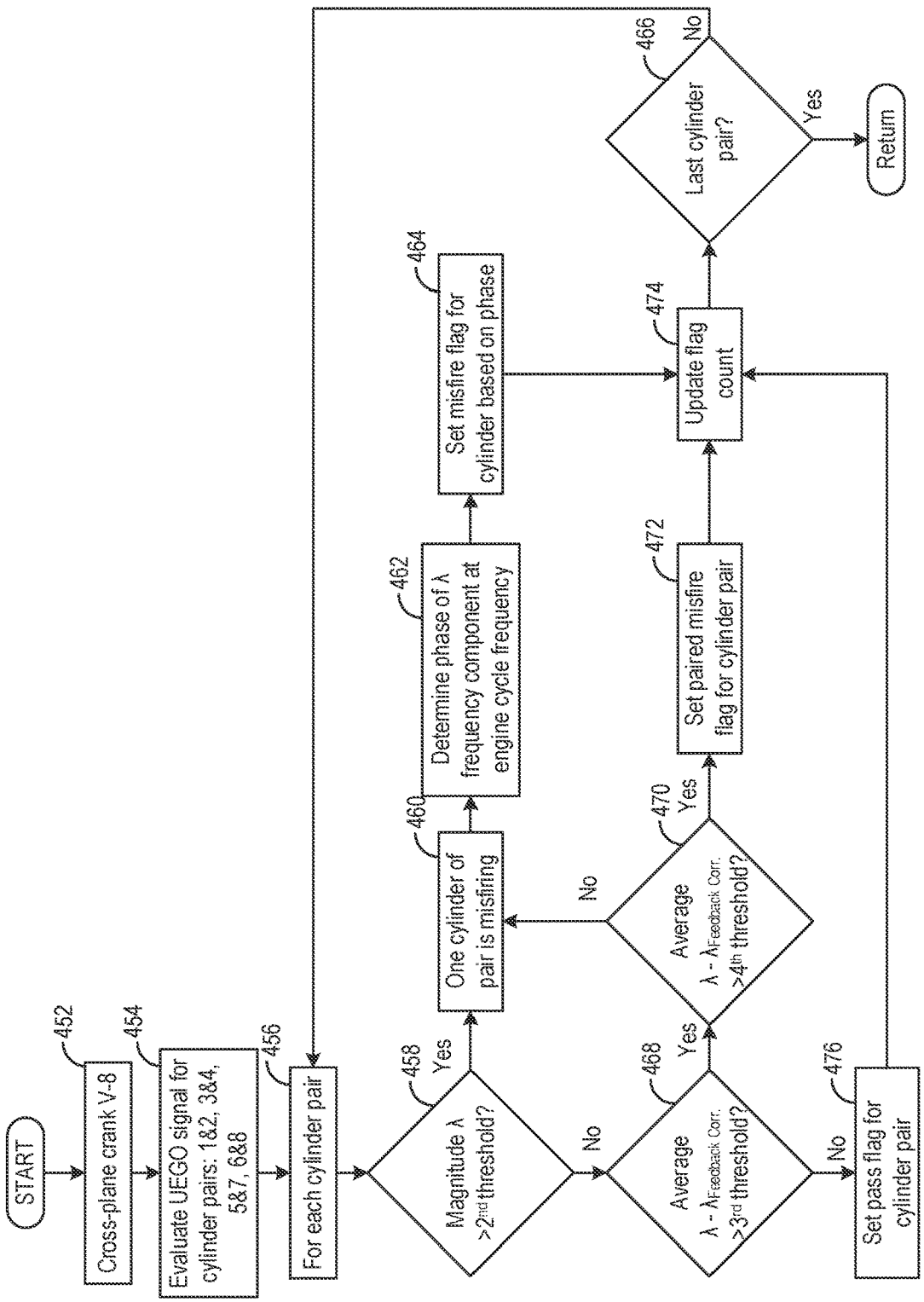
FIG. 4B is a flow chart illustrating an example cylinder misfire detection test that may be implemented in an engine system including a cross-plane crank V-8 engine, such as engine 250 of FIG. 2B.
Figure 5:
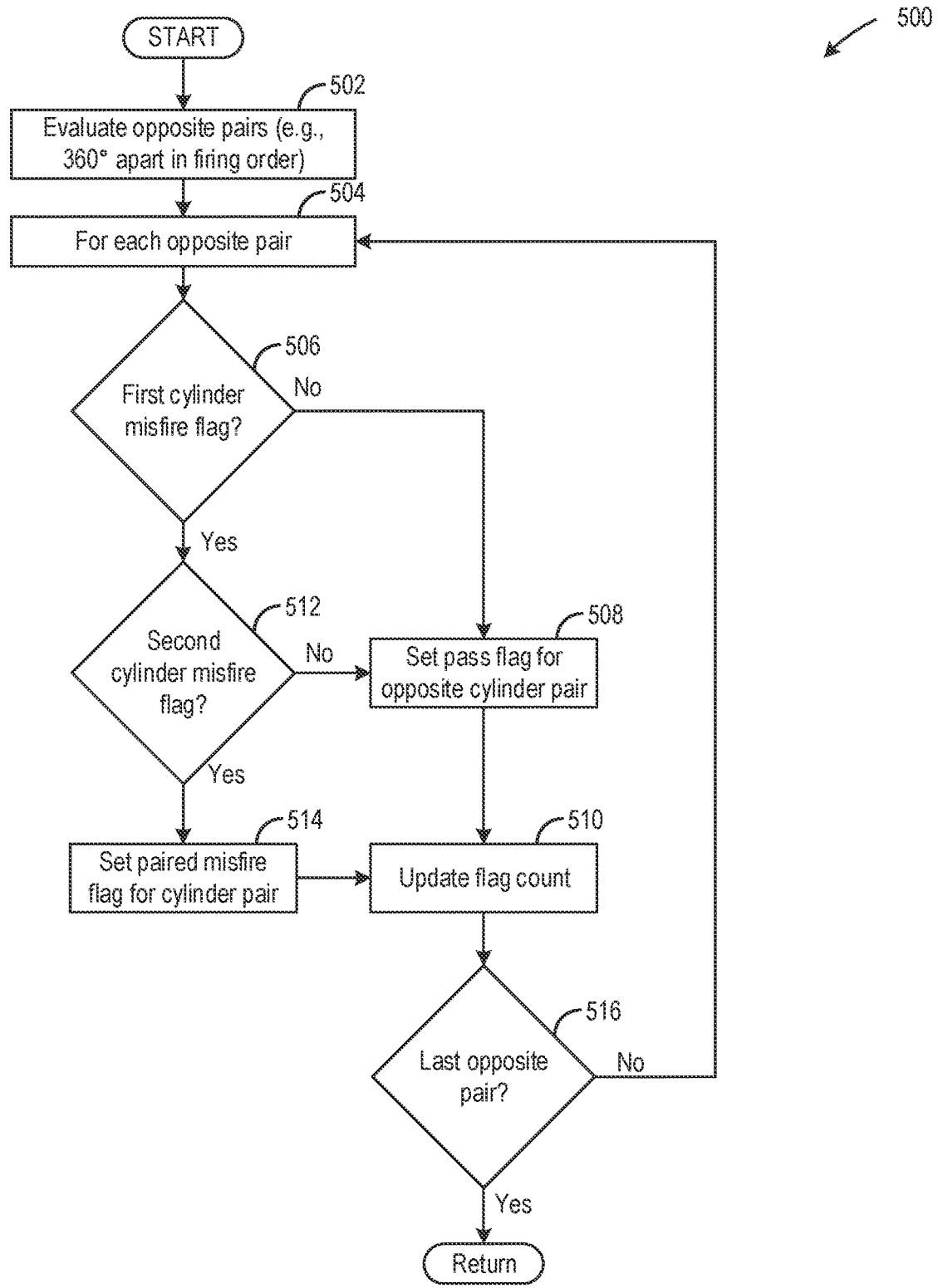
FIG. 5 is a flow chart illustrating an example a method for detection of opposite paired cylinder misfire that may be implemented in an engine system including a cross-plane crank V-8 engine, such as engine 250 of FIG. 2B.
Figures 6A, 6B:
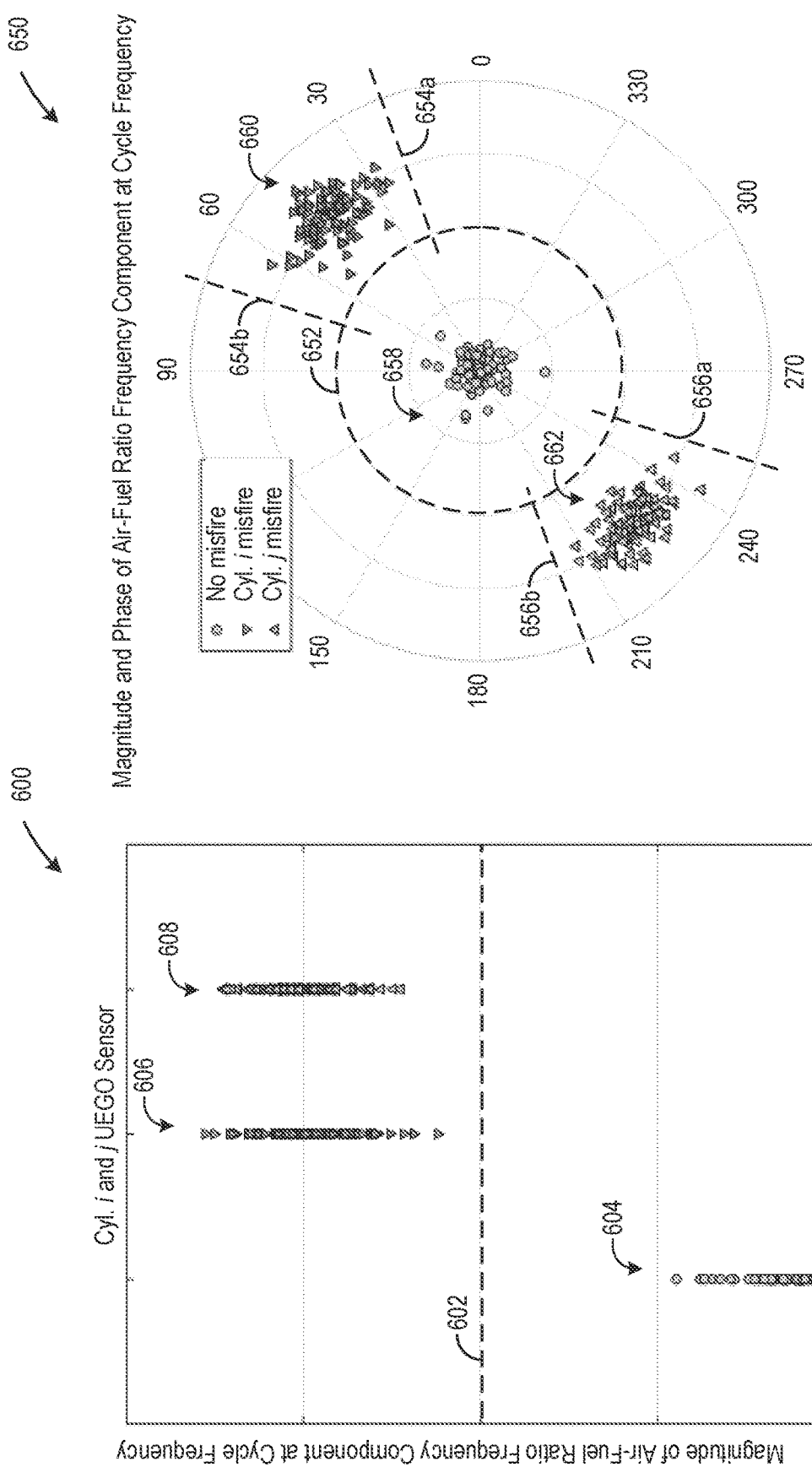
FIG. 6A is an example plot of cylinder misfire detection for a pair of cylinders sharing an exhaust gas sensor based on a magnitude of a signal of the sensor.
FIG. 6B is an example plot of cylinder misfire detection for a pair of cylinders sharing an exhaust gas sensor based on a phase and the magnitude of the signal of the sensor.
Figure 7:
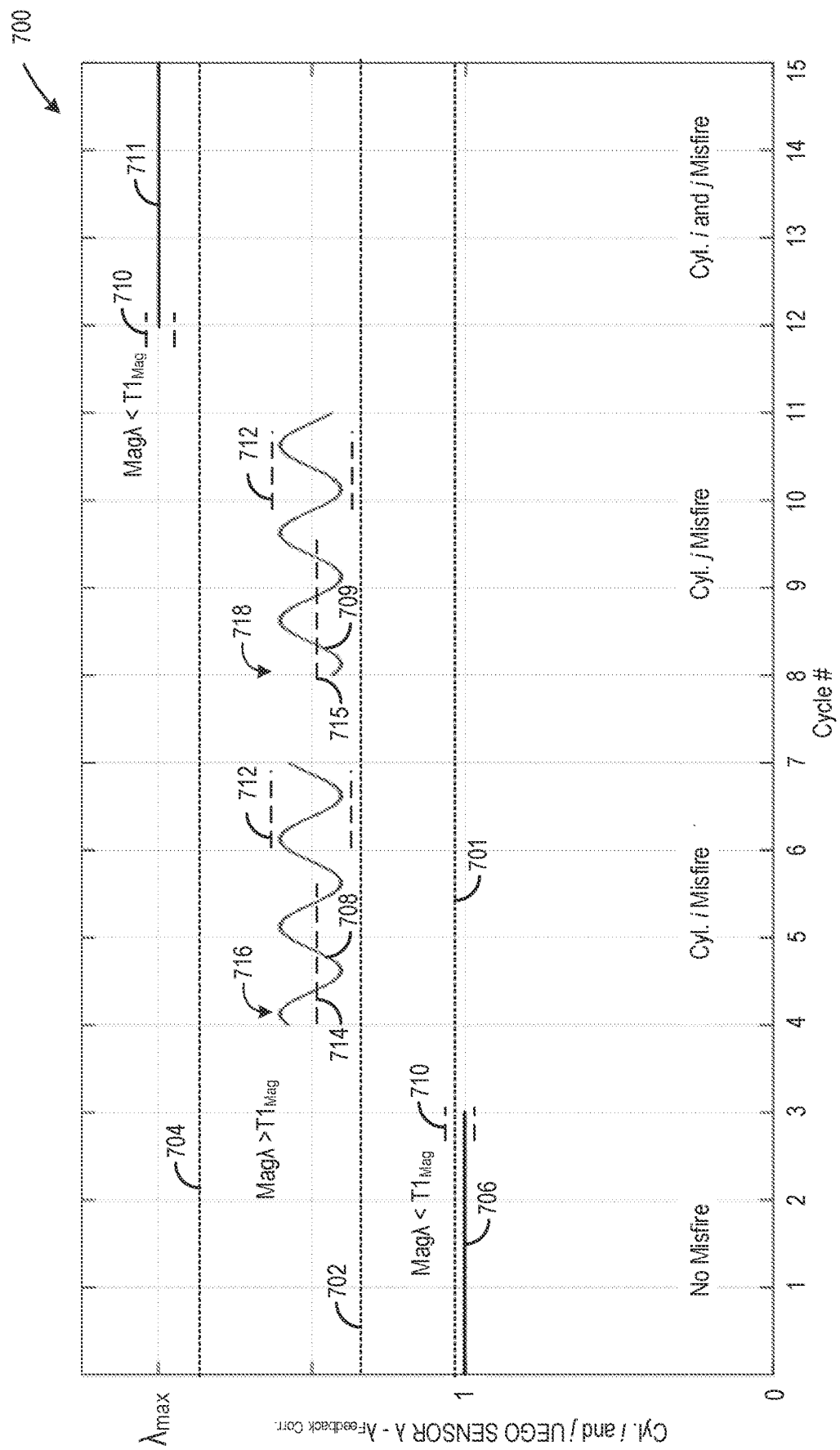
FIG. 7 is an example plot of cylinder misfire detection for a pair of cylinders sharing a single exhaust gas sensor and respective thresholds of the sensor signal.
Figure 8:
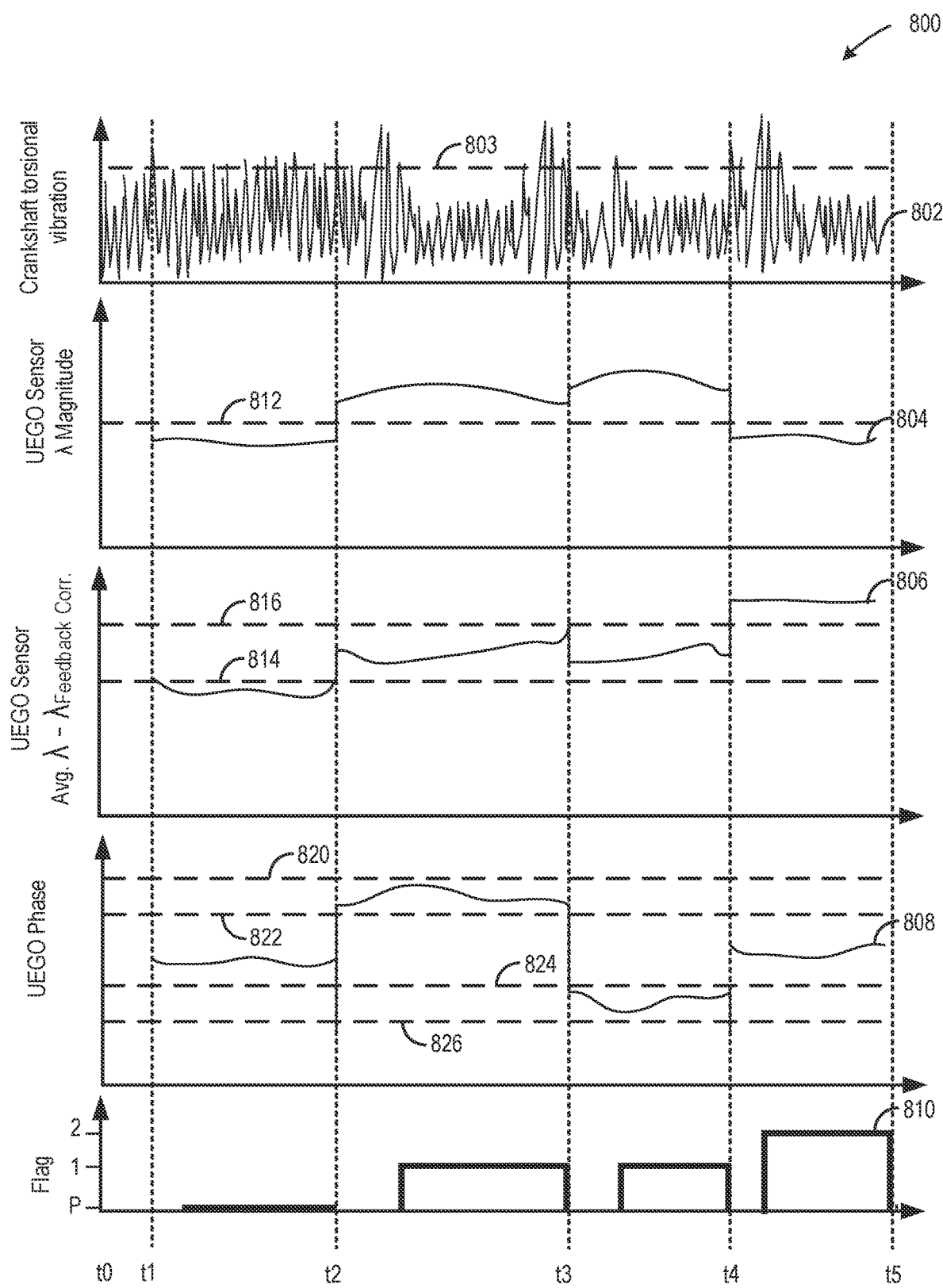
FIG. 8 is an example timing diagram for an example prophetic operation of a cylinder misfire detection method.

The following description relates to systems and methods for reliable misfire detection and cylinder identification in a vehicle engine. An example engine system comprising two cylinder banks is shown in FIG. 1. Example manifold and sensor configurations for an engine system are shown in FIGS. 2A and 2B. An engine controller may be configured to perform control routines for detecting one or more misfiring cylinders based on crankshaft acceleration and signals from an exhaust gas sensor (e.g., a universal exhaust gas oxygen [UEGO] sensor), such as the example routine illustrated in FIG. 3. A method for cylinder misfire detection in an engine system including a first manifold and sensor configuration based on signals from an exhaust gas sensor is described in the example routine of FIG. 4A. A method for cylinder misfire detection in an engine system including a second manifold and sensor configuration based on signals from an exhaust gas sensor is described in the example routine of FIG. 4B. An example of paired misfire detection in cylinder pairs not sharing a UEGO sensor and spaced 360° crank angle apart in firing order (e.g., opposite paired cylinder misfire) is shown in FIG. 5. An example plot of a magnitude of the output of a UEGO sensor for a pair of cylinders sharing an exhaust gas sensor is shown in FIG. 6A. An example plot of a magnitude and phase of an output of a UEGO sensor for a pair of cylinders sharing an exhaust gas sensor is shown in FIG. 6B. An example plot of exhaust gas sensor signal for a pair of cylinders sharing an exhaust gas oxygen sensor and respective thresholds of the sensor signal is shown in FIG. 7. An example timing diagram for a prophetic operation of a cylinder misfire detection method in an engine system including a flat-plane crank V-8 engine is illustrated in FIG. 8.

Referring now to FIG. 1, a schematic diagram showing an engine 100, which may be included in a propulsion system of a vehicle, is illustrated. The engine 100 may be a multi-cylinder engine and may be controlled at least partially by a control system 14 including a controller 12. The engine 100 may be a V-engine, and in this non-limiting example, a V-8 engine is illustrated with a first cylinder bank 102 (e.g., the right cylinder bank in FIG. 1) including four cylinders and a second cylinder bank 104 (e.g., the left cylinder bank in FIG. 1) including four cylinders. In other examples, the engine may have another number of cylinders, such as a V-12 engine, for example. In the example of FIG. 1, the first cylinder bank 102 includes a first cylinder, a second cylinder, a third cylinder, and a fourth cylinder. The second cylinder bank 104 includes a fifth cylinder, a sixth cylinder, a seventh cylinder, and an eighth cylinder. The cylinders of the first cylinder bank 102 and the second cylinder bank 104 may receive intake air from an intake passage 106 and may exhaust combustion gases via an exhaust passage 112.

In one example, the engine 100 is a diesel engine that combusts air and diesel fuel through compression ignition. In other non-limiting embodiments, the engine 100 may combust a different fuel including gasoline, biodiesel, or an alcohol containing fuel blend (e.g., gasoline and ethanol or gasoline and methanol) through compression ignition and/or spark ignition.

The intake passage 106 may include a throttle 108 having a throttle plate 110. In this particular example, the position of the throttle plate 110 may be varied by the controller 12 via a signal provided to an electric motor or actuator included with the throttle 108, a configuration that is commonly referred to as electronic throttle control (ETC). In this manner, the throttle 108 may be operated to vary the intake air provided to the engine cylinders.

As depicted, a plurality of exhaust gas sensors 116 are coupled to the exhaust passage 112 upstream of an emission control device 118. Exhaust gas sensors 116 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In FIG. 1, two sensors are shown per cylinder bank, schematically, with (2) exhaust gas sensors 116 associated with the left cylinder bank and (2) exhaust gas sensors 116 associated with the right cylinder bank. In an exemplary embodiment, a first cylinder and a second cylinder of the engine having exhaust flows combined together before being combined with other cylinders of the engine may share an exhaust gas sensor 116. In such an embodiment, a third cylinder and fourth cylinder of the engine having exhaust flows combined similarly may share a second exhaust gas sensor. A plurality of paired sensors may be similarly arranged for the V-engine and the outputs of the sensed exhaust signals may be evaluated for detection of misfire. Example sensor placement with respect to crankshaft design, firing order, and manifold architecture is described in more detail in FIG. 2A and FIG. 2B. An exhaust gas temperature sensor 117 may be coupled to the exhaust passage. The emission control device 118 is shown arranged along the exhaust passage 112 downstream of the exhaust gas sensors 116. In the example shown in FIG. 1, the emission control device 118 may be an exhaust catalyst, such as a three way catalyst, for example. In other embodiments, the device may additionally or alternatively include a particulate filter, NOx trap, selective catalytic reduction system, various other emission control devices, or combinations thereof. In some embodiments, during operation of the engine 100, the emission control device 118 may be periodically reset by operating at least one cylinder of the engine within a particular air/fuel ratio.

As depicted in FIG. 1, engine 100 is configured with a turbocharger including a turbine 120 arranged along the exhaust passage 112 and a compressor 122 arranged in the intake passage 106. The compressor 122 may be at least partially powered by the turbine 120 via a shaft (not shown). The turbocharger increases air charge of ambient air drawn into the intake passage 106 in order to provide greater charge density during combustion to increase power output and/or engine-operating efficiency. While in this case a single turbocharger is included, the system may include multiple turbine and/or compressor stages.

Further, as shown in FIG. 1, a charge air cooler (CAC) 124 is arranged along the intake passage 106 upstream of throttle 108 for cooling intake air after it has passed through the compressor 122 of the turbocharger. Condensate that is formed in the CAC 124 may be carried out of the CAC 124 by intake air passing through the CAC 124, and may be ingested by cylinders of the engine 100. In some cases, the condensate ingested by the engine may result in cylinder bank misfire, for example. As described in greater detail with relation to FIG. 3, such misfire may be detected by monitoring each of crankshaft torsional vibrations, exhaust gas air fuel ratio, and exhaust temperature. During a misfire event, there may be fluctuations in the crankshaft torsional vibration together with a higher than threshold air fuel ratio, a higher than a threshold fluctuation in air fuel ratio, and a higher than threshold exhaust temperature. Responsive to detection of such a misfire event, a cylinder bank may be deactivated and then sequentially reactivated under certain conditions in order to reduce degraded vehicle performance resulting from cylinders deactivated for an extended period. Thus, the engine system further includes a crankshaft position sensor 126, or Hall effect sensor coupled to the crankshaft 128, configured to monitor the position and/or rotational speed of the crankshaft 128.

Engine 100 of FIG. 1 may further include a low-pressure exhaust gas recirculation (EGR) system for routing exhaust gas from downstream of the turbine to upstream of the compressor. Such operation may exacerbate condensate formation under selected conditions. The methods of operating the engine may include flowing low-pressure EGR during engine operation. Also, the engine may comprise a high-pressure EGR system for routing exhaust gas from upstream of the turbine to downstream of the compressor.

Engine 100 may further include control system 14. Control system 14 is shown receiving information from a plurality of sensors 16 (various examples of which are described herein) and sending control signals to a plurality of actuators 18 (various examples of which are described herein). As one example, sensors 16 may include crankshaft position sensor 126 (e.g., for sensing crankshaft acceleration), or Hall effect sensor, exhaust gas oxygen sensors 116, exhaust gas temperature sensor 117, MAP sensor, exhaust pressure sensor, compressor inlet temperature sensor, compressor inlet pressure sensor, compressor inlet humidity sensor, and EGR sensor. Other sensors such as additional pressure, temperature, air fuel ratio, and composition sensors may be coupled to various locations in engine 100. The actuators 18 may include, for example, throttle 108, EGR valve, wastegate, and fuel injector. The control system 14 may include a controller 12. Controller 12 may receive input data from the various sensors, process the input data, and trigger various actuators in response to the processed input data based on instruction or code programmed therein corresponding to one or more routines. In one example, controller 12 may receive inputs from each of the crankshaft position sensor 126, exhaust gas sensors 116, and exhaust gas temperature sensor 117 to determine the occurrence of a cylinder misfire event. In response to a detection of a misfire event, the controller 12 may send a signal to the fuel injectors to discontinue fuel injection to one or more cylinders in the engine.

In the example of FIG. 1, the engine 100 is a spark-ignited V-8 engine for which engine characteristics such as firing order may determine sensor arrangement and exhaust manifold design. FIGS. 2A and 2B show example manifold and sensor configurations, which may be implemented for good observability and exhaust pulse separation, particularly to allow for time to observe exhaust signals. FIG. 2A is an illustration of an example engine 200 including a first firing order. FIG. 2B is an illustration of an example engine 250 including a second firing order.

Turning first to FIG. 2A, a diagram of an exhaust manifold and sensor configuration for an engine 200 is shown. Engine 200 is an eight cylinder flat-plane crank V-engine. Engine 200 includes a first cylinder bank 202 (e.g., the right cylinder bank in FIG. 2A) including four cylinders and a second cylinder bank 204 (e.g., the left cylinder bank in FIG. 2A) including four cylinders. In an example, the exhaust manifold and sensor configuration depicted for engine 200 may be included in an engine system (e.g., engine system 100 of FIG. 1) and be in electronic communication with a control system (e.g., control system 14 of FIG. 1) including controller 12 (e.g., also of FIG. 1). In the example of FIG. 2A, the first cylinder bank 202 includes a first cylinder, a second cylinder, a third cylinder, and a fourth cylinder. The second cylinder bank 204 includes a fifth cylinder, a sixth cylinder, a seventh cylinder, and an eighth cylinder. The cylinders of the first cylinder bank 202 and the second cylinder bank 204 may receive intake air from an intake passage 206 and may exhaust combustion gases to exhaust passage 112 (e.g., of FIG. 1) via branched exhaust manifold 226.

The intake passage 206 may include a throttle 208 having a throttle plate 210. In this particular example, the position of the throttle plate 210 may be varied by the controller 12 via a signal provided to an electric motor or actuator included with the throttle 208, a configuration that is commonly referred to as electronic throttle control (ETC). In this manner, the throttle 208 may be operated to vary the intake air provided to the engine cylinders.

A plurality of pre-catalyst UEGO sensors are coupled to branched exhaust manifold 226 upstream from exhaust passage 112. UEGO sensor placement may be based on engine design characteristics, such as exhaust manifold connectively and cylinder firing order. In one example, cylinders may fire in the order as follows: cylinder 1, cylinder 5, cylinder 4, cylinder 8, cylinder 3, cylinder 7, cylinder 2, and cylinder 6. In this example, four UEGO sensors, each monitoring two cylinders, are coupled to branched exhaust manifold 226 at a confluence point. A first UEGO sensor 212 monitors cylinder 1 and cylinder 3. A second UEGO sensor 214 monitors cylinder 2 and cylinder 4. A third UEGO sensor 216 monitors cylinder 5 and cylinder 7. A fourth UEGO sensor 218 monitors cylinder 6 and cylinder 8. Exhaust manifold connectivity and sensor placement in this way avoids cylinders firing 180° apart from sharing the same UEGO sensor. Each pair of cylinders sharing a UEGO sensor fire 360° apart providing separation between exhaust pulses and overall increased observability of signal.

UEGO sensors may be positioned to increase observability of exhaust flows from the pair of cylinders sharing the sensor and minimize observation of exhaust flows from other cylinders. The UEGO sensor may be placed where (or near after) exhaust from the pair of cylinders combines together and before exhaust from other cylinders is combined with sensed exhaust from the pair of cylinders sharing the sensor. As an example, exhaust manifold connectivity and UEGO sensor placement for cylinder 1 and cylinder 3 is described in more detail. In the firing order of example engine 200, cylinder 1 fires first and cylinder 3 first fifth (e.g., 3600 apart in firing order). Cylinder 1 is coupled to first branch 220 of first manifold passage 228 of branched exhaust manifold 226. Cylinder 3 is coupled to second branch 222 of first manifold passage 228 of branched exhaust manifold 226. Exhaust from cylinder 1 is directed through first branch 220. Exhaust from cylinder 3 is directed through second branch 222. First branch 220 and second branch 222 join at confluence 224, whereafter exhaust from cylinder 1 and cylinder 3 are channeled through third branch 225 to be routed to an emission control device (e.g., emission control device 118 of FIG. 1) via exhaust passage 112. First UEGO sensor 212 is coupled to first manifold passage 228 downstream from confluence 224 (e.g., immediately thereafter) and before exhaust passage 112 so as to separate exhaust from the combustion of other cylinders from the combustion of cylinders 1,3 monitored by first UEGO sensor 212. In other words, first UEGO sensor 212 may monitor exhaust within third branch 225 produced by cylinder 1 and cylinder 3. UEGO sensor placement may be determined similarly for each pair of cylinders described above (e.g., UEGO sensors 214, 216, 218).

Turning now to FIG. 2B, a diagram of an exhaust manifold and sensor configuration for an engine 250 is shown. Engine 250 is an eight cylinder cross-plane crank V-engine. Engine 250 includes with a first cylinder bank 252 (e.g., the right cylinder bank in FIG. 2B) including four cylinders and a second cylinder bank 254 (e.g., the left cylinder bank in FIG. 2B) including four cylinders. In an example, the exhaust manifold and sensor configuration depicted for engine 250 may be included in an engine system (e.g., engine system 100 of FIG. 1) and may be in electronic communication with a control system (e.g., control system 14 of FIG. 1) including controller 12 (e.g., also of FIG. 1). In the example of FIG. 2B, the first cylinder bank 252 includes a first cylinder, a second cylinder, a third cylinder, and a fourth cylinder. The second cylinder bank 254 includes a fifth cylinder, a sixth cylinder, a seventh cylinder, and an eighth cylinder. The cylinders of the first cylinder bank 252 and the second cylinder bank 254 may receive intake air from an intake passage 256 and may exhaust combustion gases to exhaust passage 112 (e.g., of FIG. 1) via branched exhaust manifold 276.

The intake passage 256 may include a throttle 258 having a throttle plate 260. In this example, the position of the throttle plate 260 may be varied by the controller 12 via a signal provided to an electric motor or actuator included with the throttle 208, a configuration that is commonly referred to as electronic throttle control (ETC). In this manner, the throttle 258 may be operated to vary the intake air provided to the engine cylinders.

A plurality of pre-catalyst UEGO sensors are coupled to branched exhaust manifold 276 upstream from exhaust passage 112. UEGO sensor placement may be based on engine design characteristics, such as exhaust manifold connectively and cylinder firing order. In one example, cylinders may fire in the order as follows: cylinder 1, cylinder 3, cylinder 7, cylinder 2, cylinder 6, cylinder 5, cylinder 4, and cylinder 8. In this example, four UEGO sensors, each monitoring two cylinders, are coupled to branched exhaust manifold 276 at a confluence point. A first UEGO sensor 262 monitors cylinder 1 and cylinder 2. A second UEGO sensor 264 monitors cylinder 3 and cylinder 4. A third UEGO sensor 266 monitors cylinder 5 and cylinder 7. A fourth UEGO sensor 268 monitors cylinder 6 and cylinder 8. Here exhaust manifold connectivity and sensor placement in this way avoids cylinders firing 90° apart from sharing the same UEGO sensor. Each pair of cylinders sharing a UEGO sensor fire 270° apart providing separation between exhaust pulses and overall increased observability of signal.

As one example, exhaust manifold connectivity and UEGO sensor placement for cylinder 1 and cylinder 2 is described in more detail. In the firing order of example engine 250, cylinder 1 fires first and cylinder 2 fires fourth (e.g., 270° apart in firing order). Cylinder 1 is coupled to first branch 270 of first manifold passage 278 of branched exhaust manifold 276. Cylinder 2 is coupled to second branch 272 of first manifold passage 278 of branched exhaust manifold 276. Exhaust from cylinder 1 is directed through first branch 270. Exhaust from cylinder 2 is directed through second branch 272. First branch 270 and second branch 272 join at confluence 274, whereafter exhaust from cylinder 1 and cylinder 2 are channeled through third branch 275 to be routed to an emission control device (e.g., emission control device 118 of FIG. 1) via exhaust passage 112. First UEGO sensor 262 is coupled to first manifold passage 278 downstream from confluence 274 (e.g., immediately thereafter) and before exhaust passage 112 so as to separate exhaust from the combustion of other cylinders (e.g., cylinders 3,4) from the combustion of cylinders 1,2 monitored by first UEGO sensor 262. In other words, first UEGO sensor 262 may monitor exhaust within third branch 275 produced by cylinder 1 and cylinder 2. UEGO sensor placement may be determined similarly for each pair of cylinders described above (e.g., UEGO sensors 264, 266, 268).

The controller 12 and control system 14 receive signals from the various sensors and employ the various actuators of FIGS. 1, 2A, and 2B to adjust engine operation and perform control routines based on the received signals and instructions stored on a memory of the controller. Arranged as described above with respect to FIGS. 2A, 2B, with each exhaust gas sensor monitoring exactly two cylinders, a pair of firing cylinders, one misfiring cylinder, a pair of misfiring cylinders, and/or opposite paired misfire may be detected. For example, the control system 14 may include instructions to detect misfire in one or more of cylinders based on based on signal output from crankshaft position sensor 126 and an output from an exhaust gas sensor (e.g., exhaust gas sensors 116). In one example, the control system may detect misfire events based on a magnitude and phase of oscillation of the exhaust gas sensor signal relative to a firing order of the engine. The control system may further detect opposite paired misfire (e.g., misfires in cylinders 360° apart in firing order) by comparing the (not shared) sensor signals monitoring the opposite pair (e.g., FIG. 5).

In this way, the systems of FIGS. 1, 2A, and 2B provide for a system for diagnosing cylinder misfire in a V-engine with many cylinders, comprising: an engine with a first and a second cylinder group, an exhaust system including an exhaust temperature sensor, a crankshaft acceleration sensor coupled to the engine, and a plurality of exhaust gas oxygen sensors each monitoring a pair of cylinders, and a controller. In an example, the cylinder groups are exclusive, in that a cylinder in one group is not in any other group. The system may include only a first cylinder and second cylinder of the engine having exhaust flows combined together in a first exhaust passage of an exhaust system before being combined with other cylinders of the engine with an exhaust gas sensor in a position to sense exhaust from only the first cylinder and the second cylinder and before exhaust from other cylinders is combined with the sensed exhaust from the first cylinder and the second cylinder. A second exhaust gas sensor may be mounted similarly in a second position to sense exhaust from only a third cylinder and a fourth cylinder. The second sensor may sense exhaust flows from only the third and fourth cylinders combined together in a second exhaust passage so as to minimize comingling of exhaust from the combustion of other cylinders (e.g., associated with other UEGO sensors) of the engine. The second exhaust gas sensor positioned in this way may sample only exhaust from the third cylinder and the fourth cylinder. In this arrangement, the output signal of the exhaust gas sensors may be reliably associated with pair of cylinders only and the strength of the signal increased relative to a single exhaust gas oxygen sensor observing, for example, an entire bank cylinders. The strength of the signal may allow for observing a magnitude and a phase of a lean shift due to a misfire, allowing for differentiation between firing cylinder, single cylinder misfire, and paired cylinder misfire conditions.

Control routines for misfire detection and cylinder identification in an engine system, such as engine system 100, are described below with reference to FIG. 3, FIGS. 4A-4B, and FIG. 5. In the present disclosure, a method 300 uses an output from a crankshaft position sensor and misfire flags received from one or more cylinder misfire tests (e.g., methods 400 and 450 of FIG. 4A and FIG. 4B, respectively) to detect misfire events and identify misfiring cylinders. In one example, the misfire flags received from one or more cylinder misfire tests may be generated from an evaluation of an exhaust gas oxygen sensor output (e.g., oxygen sensors, UEGO sensors) for a pair of cylinders of the engine. In one example, the UEGO sensor output may include a magnitude and/or phase of oscillation of the sensor signal. A cylinder misfire test may include grouping only a first pair of cylinders and only a second pair of cylinders, each with separate oxygen sensors, and identifying a cylinder with a misfire based on the separate oxygen sensors and a firing order. As one example, the grouped cylinders may always have another cylinder (not one of the cylinders in the group) firing between them in the firing order. FIG. 4A illustrates an example method 400 for identifying one or more misfiring cylinders in an engine system including a flat-plane crank engine (e.g., engine 200 of FIG. 2A) based on signal output from a plurality of UEGO sensors arranged in a first configuration based on an engine firing order. FIG. 4B illustrates an example method 450 for identifying one or more misfiring cylinders in an engine system including a cross-plane crank engine (e.g., engine 250 of FIG. 2B) based on signal output from a plurality of UEGO sensors arranged in a second configuration based on a second engine firing order. A test for detecting opposite paired cylinder misfires is illustrated in method 500 of FIG. 5.

Figure 3:
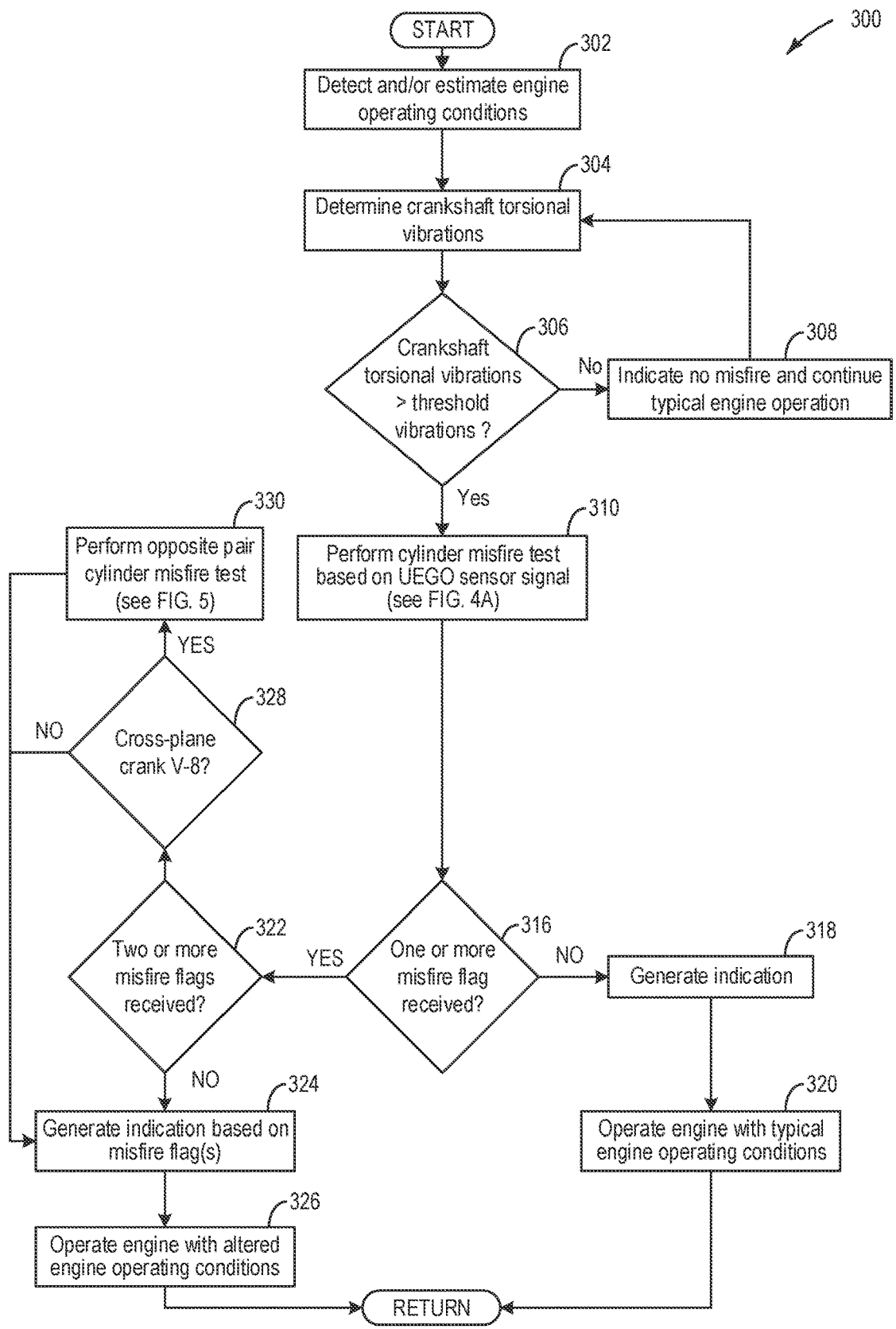
FIG. 3 is a flow chart illustrating an example method that may be implemented for detection of cylinder misfire in an engine system.

Referring now to FIG. 3, a method 300 is shown for misfire detection and cylinder identification in an engine system, such as the engine system 100 described above with reference to FIG. 1. Instructions for carrying out method 300 and the rest of the methods included herein may be executed by a controller of a control system (e.g., controller 12) based on instructions stored on a memory of the controller and in conjunction with signals received from sensors of the engine system, such as the sensors described above with reference to FIGS. 1-2. The controller may adjust engine operating conditions based on a determination of engine system performance, according to the methods described below.

At 302, the method includes estimating current engine operating parameters including, for example, engine load, engine speed, vehicle speed, crankshaft acceleration, exhaust air fuel ratio, exhaust gas temperature, manifold vacuum, throttle position, spark timing, EGR flow, exhaust pressure, number of activated cylinders, etc.

At 304, engine crankshaft fluctuations, e.g., torsional vibrations, may be estimated from crankshaft acceleration as determined via a crankshaft sensor attached to the crankshaft (such as the crankshaft position sensor 126 shown in FIG. 1). Once the torsional vibrations are determined, at 306, the routine includes determining if the crankshaft torsional vibrations are greater than a threshold vibration level. Alternatively, the crankshaft acceleration corresponding to the crankshaft torsional vibration may be determined and the crankshaft acceleration may be compared to a threshold acceleration above which vibration may occur. In one example, the threshold torsional vibrations may correspond to expected values of crankshaft acceleration when all active cylinders are optimally operational. As another example, the threshold vibrations may be estimated in specific crank intervals aligned with the firing period of a particular cylinder. If it is determined that the crankshaft torsional vibration is lower than the threshold vibration level, at 308 a misfire event may not be indicated, and typical engine operation may continue. The method may return to 304. In an additional or alternative embodiment, steps 304 and 306 may be omitted, and misfire detection may be based on UEGO sensors only.

If it is determined that torsional vibrations are higher than the threshold vibrations, then at 310, a cylinder misfire test based on UEGO sensor output may be performed. At 310, the method directs to FIG. 4A. FIG. 4A illustrates a misfire detection test for a flat-plane crank V-8. From FIG. 4A, the method may direct to FIG. 4B for a misfire detection test in an engine system including a cross-plane crank V-8. Methods 400 and 450 of FIGS. 4A, 4B, respectively, generate diagnostic indications including pass flags for cylinder pairs where no misfire is detected, misfire flags for detected misfire, and/or paired misfire flags for detected paired misfire. The flags are evaluated below at step 316. Following the cylinder misfire test at 310, the method continues to 316.

At 316, the method includes determining whether one or more misfire flags are received, e.g., misfire or paired misfire flags from methods 400, 450 of FIGS. 4A, 4B, respectively. If no misfire flags are received, the method continues to 318 where an indication of no cylinder misfire event may be generated. The method then continues to 320. At 320, the method includes operating the engine with typical engine operating conditions (e.g., without deactivating misfiring cylinders).

Returning to 316, if one or more misfire flags are received, the method continues to 322. At 322, the method includes determining whether two or more misfire flags are received. If two or more misfire flags are not received (e.g., one misfire flag only), the method continues to 324. At 324, the method includes generating an indication based on receipt of one or more misfire flags. In one example, the indication may include notifying an operator or technician of the misfire status and position of the misfiring cylinder. As another example, the indication may refer the operator and/or technician to a database where the diagnostic flags are stored.

From 324, the method continues to 326. At 326, the method includes operating the engine with the one or more altered engine operating conditions. In one example, instructions may be given to deactivate and reactivate the cylinder bank in which misfire is occurring. As an example, in order to deactivate the cylinders of a bank, fuel injection to the misfiring cylinder(s) may be cut-off or the cylinder valves (e.g., intake and exhaust valves) may be deactivated. In addition, the misfire count and history of the misfiring cylinder may be updated in the controller's memory. At this time, a timer may also be initiated to record a time elapsed since the cylinder bank deactivation. In another example, the cylinder in which misfiring has been detected may be selectively deactivated while maintaining the other cylinders of the bank active. From 326, the method returns.

Returning to 322, if two or more fault flags are received, the method continues to 328. At 328, the method includes determining whether the engine is a cross-plane crank V-8 engine (e.g., engine 250 of FIG. 2B). If the engine is a cross-plane crank V-8 engine, the method continues to 330 where an opposite pair cylinder misfire test is performed. Cross-plane crank V-8 engines may undergo an additional cylinder misfire test for detecting opposite paired misfires (e.g., 3600 apart in firing order). A cross-plane crank V-8 engine may have cylinders firing 360° apart not sharing a sensor, therefore the additional test may be appreciated. If only one flag is received, whether it is a paired misfire flag or single misfire flag, the opposite pair misfire test may be redundant. An exemplary embodiment of the opposite pair misfire test is illustrated in FIG. 5.

If the engine is not a cross-plane crank V-8 engine, the method continues to 324. In one example, an additional test may not be performed for a flat-plane crank V-8 engine (e.g., engine 200 of FIG. 2A) due to the arrangement of UEGO sensors and cylinder firing order. Opposite paired cylinders may be on the same bank and may share a UEGO sensor on a flat-plane crank V-8 engine. With such a configuration, the method 400 described in FIG. 4A below may detect an opposite paired misfire in the same manner as a paired misfire. At 324, an indication based on misfire flags(s) received may be generated. The method then continues to 326 where the engine may be operated with altered operating conditions. From 326, the method returns.

In one example, a sampling rate of the UEGO sensors for the disclosed misfire tests may be established offline during a calibration process. The method may include adjusting the sampling rate based on a magnitude and/or a phase of the sensor output.

FIG. 4A illustrates an example method 400 for detecting misfiring events and identifying one or more misfiring cylinders based on an output from a UEGO sensor monitoring a pair of cylinders. Method 400 may be carried out at step 310 of the example method 300 in FIG. 3.

The method determines at 402 whether the engine is a flat-plane crank V-8 (e.g., engine 200 of FIG. 2A). If it determined that the engine is not a flat-plane crank V-8 the method continues to 406. At 406, the method directs to FIG. 4B where a method 450 for detecting misfire is illustrated for an engine system including a cross-plane crank V-8 engine (e.g., engine 250 of FIG. 2B.)

If the method determines the engine is a flat-plane crank V-8, the method continues to 404. At 404, the method includes evaluating the UEGO sensor signal for cylinder pairs sharing a UEGO sensor. In the example method, the UEGO sensor signal is evaluated for the following cylinder pairs: cylinders 1 and cylinder 3, cylinder 2 and cylinder 4, cylinder 5 and cylinder 7, and cylinder 6 and cylinder 8. As an example, sensor arrangement may be based on one or more characteristics of the engine system and/or operating conditions, e.g., the engine firing order, crankshaft design, exhaust manifold configuration. In another embodiment, a flat-plane crank V-8 may have a different firing order resulting in a different cylinder pairing. For example, a firing order such as 1-5-3-7-4-8-2-6 may include example cylinder pairs: cylinder 1 and cylinder 4, cylinder 2 and cylinder 3, cylinder 5 and cylinder 8, and cylinder 6 and cylinder 7.

At 408, the method includes evaluating the UEGO sensor signal for each cylinder pair. At 410, the method includes determining whether the magnitude of the normalized air-fuel ratio (λ) frequency component at engine cycle frequency is greater than a first threshold magnitude (e.g., $Mag_\lambda > T1_{Mag}$). In one example, the first threshold magnitude may be a preset non-zero value. In one example, the first threshold may be a function of one or more parameters such as qualities of the sensor, engine speed, and/or an engine load. An example plot of $Mag_\lambda$ for a pair of cylinders sharing a sensor and threshold magnitude are given in FIG. 6A. If magnitude of the air-fuel ratio (λ) frequency component frequency component is greater than the first threshold magnitude the method continues to 412 where the method determines that one cylinder pair is misfiring.

At 414, the method includes determining the phase of the air-fuel ratio (λ) frequency component at engine cycle frequency. The phase identifies which cylinder of the pair of cylinders is misfiring. For a pair of cylinders sharing a sensor, the phase of the air-fuel ratio (λ) frequency component at engine cycle frequency corresponding to a first cylinder of the pair misfiring is expected to be opposite (e.g., π(rad) or 180° or 360 crank-angle degrees apart on average) to the phase of air-fuel ratio (λ) frequency component at engine cycle frequency corresponding to a second cylinder of the pair misfiring. The bounds on phase values for cylinder identification are a function of exhaust transport delay, which in turn, is a function of multiple variables including engine speed, engine load, exhaust temperature, and pressure. As an example, a pair of cylinders sharing a single UEGO sensor may comprise a first and a second cylinder. An air-fuel ratio (λ) frequency component oriented (on a polar plot) in a first direction may indicate a misfire on the first cylinder of the cylinder pair. An air-fuel ratio (λ) frequency component oriented in a second direction may indicate a misfire on the second cylinder of the cylinder pair. Air-fuel ratio (λ) frequency component at cycle frequency and phase values for a pair of cylinders sharing a UEGO sensor is described in more detail in plot 650 and plot 700 of FIG. 6B and FIG. 7, respectively.

At 416, the method includes setting a misfire flag for the misfiring cylinder based on phase. In one example, the misfire flag may be a first flag of three flag settings (e.g., pass, misfire, paired misfire). The misfire flag may include an indication that the sensor output for the pair of cylinders has been evaluated and the position of the misfiring cylinder.

The method continues to 424. At 424, the method includes updating the flag count. The controller may continuously update the flag count based on the one or more flags received during operation of the method 400. For example, the controller may maintain a log of the flags received during the operation of the method 400.

The method continues to 426. At 426, method determines whether the evaluated cylinder pair is the last cylinder pair. If yes, the method returns. If the evaluated cylinder pair is the not last cylinder pair, the method returns to 408 to evaluate the UEGO sensor signal for additional cylinder pairs.

Returning to 410, if the method determines the magnitude of the air-fuel ratio (λ) frequency component at engine cycle frequency is less than the first threshold magnitude (e.g., $Mag_\lambda < T1_{Mag}$), the method continues to 418.

At 418, the method includes determining if the average air-fuel ratio ($\lambda$) (e.g., $\lambda$ averaged over one or more engine cycles) minus feedback correction is greater than a first threshold air-fuel ratio ($\lambda$) minus feedback correction (average [$\lambda-\lambda_{feedback\ corr.}$]>T1$_{\overline{\Delta\lambda}}$; hereafter referred to as threshold average difference). In one example, the first threshold average difference may be a preset non-zero value. If yes, the method continues to 420.

At 420, the method includes determining if the average air-fuel ratio ($\lambda$) (e.g., $\lambda$ averaged over one or more engine cycles) minus feedback correction is greater than a second threshold average difference (average [$\lambda-\lambda_{feedback\ corr.}$]>T2$_{\overline{\Delta\lambda}}$). In one example, the second threshold average difference may be a preset non-zero value. As an example, a misfire may cause a lean shift of the average A, but closed-loop fuel feedback may reduce or eliminate the (average) lean shift, so it may be preferable to use an average difference [$\lambda-\lambda_{feedback\ corr.}$] instead of an average ($\lambda$) to measure the (average) lean shift and detect misfire. In such an example, the average difference [$\lambda-\lambda_{feedback\ corr.}$] greater than a first threshold average difference but less than a second threshold average difference may indicate a single misfiring cylinder of a pair. If the average difference [$\lambda-\lambda_{feedback\ corr.}$] is less than a second threshold average difference, from 420 the method continues to 412. At 412, the method determines that one cylinder of the pair is misfiring and may identify the misfiring cylinder based on the phase of the air-fuel ratio frequency ($\lambda$) component at engine cycle frequency.

Returning to 420, if the method determines that the average air-fuel ratio ($\lambda$) minus feedback correction is greater than a second threshold average difference, the method continues to 422.

At 422, the method includes setting a paired misfire flag for the misfiring cylinder pair. In one example, the paired misfire flag may be a second flag of three flag settings (e.g., pass, misfire, paired misfire). The paired misfire flag may include an indication that the sensor output for the pair of cylinders has been evaluated and the position of the misfiring cylinder pair. As an example, a paired misfire may produce a zero or near-zero oscillation, similar to a no misfire condition described below. However, the average air-fuel ratio ($\lambda$) (e.g., A averaged over one or more engine cycles) minus feedback correction may saturate around the largest UEGO sensor reading. Thus, the magnitude and the average difference [$\lambda-\lambda_{feedback\ corr.}$] may be evaluated in tandem to determine paired misfires in cylinders sharing a UEGO sensor.

The method continues to 424. At 424, the method includes updating the flag count. The controller may continuously update the flag count based on the one or more flags received during operation of the method 400.

The method continues to 426. At 426, method determines whether the evaluated cylinder pair is the last cylinder pair. If yes, the method returns. If the evaluated cylinder pair is the not last cylinder pair, the method returns to 408 to evaluate the UEGO sensor signal for additional cylinder pairs.

Returning to 418, if the method determines that the average air-fuel ratio ($\lambda$) minus feedback correction is less than the first threshold average difference, the method continues to 428.

At 428, the method includes setting a pass flag for the cylinder pair. In one example, the pass flag may be a third flag of three settings (e.g., pass, single misfire, paired misfire). The pass flag may include an indication that the sensor output for the pair of cylinders has been evaluated and the position of the firing cylinder pair (e.g., no misfire). As an example, no misfire condition may produce a zero or near-zero air-fuel ratio oscillation, similar to a paired misfire condition. However, a no misfire condition produces an average air-fuel ratio ($\lambda$) value near one.

The method continues to 424. At 424, the method includes updating the flag count. The controller may continuously update the flag count based on the one or more flags received during operation of the method 400.

The method continues to 426. At 426, method determines whether the evaluated cylinder pair is the last cylinder pair. If yes, the method returns. If the evaluated cylinder pair is the not last cylinder pair, the method returns to 408 to evaluate the UEGO sensor signal for additional cylinder pairs.

FIG. 4B illustrates an example method 450 for detecting one or more misfiring events and identifying one or more misfiring cylinders based on an output from a UEGO sensor monitoring a pair of cylinders. Method 450 may be executed for detecting misfire in an engine system including a cross-plane crank V-8 engine (e.g., engine 250 of FIG. 2B). The method 450 may be carried out from step 406 of the example method 400 in FIG. 4A.

The method 450 begins at 452. At 452, the method determines the engine is a cross-plane crank V-8 engine. The method continues to 454.

At 454, the method includes evaluating the UEGO sensor signal for cylinder pairs sharing a UEGO sensor. In the example method, the UEGO sensor signal is evaluated for the following cylinder pairs: cylinders 1 and cylinder 2, cylinder 3 and cylinder 4, cylinder 5 and cylinder 7, and cylinder 6 and cylinder 8. As an example, sensor arrangement may be based on one or more characteristics of the engine system and/or operating conditions, e.g., the engine firing order, crankshaft design, exhaust manifold configuration. In another embodiment, a cross-plane crank V8 may have a different firing order resulting in different cylinder pairing. For example, a firing order such as 1-5-4-8-6-3-7-2 may include example cylinder pairs: cylinder 1 and cylinder 3, cylinder 2 and cylinder 4, cylinder 5 and cylinder 6, and cylinder 7 and cylinder 8.

At 456, the method includes evaluating the UEGO sensor signal for each cylinder pair. At 458, the method includes determining whether the magnitude of the air-fuel ratio ($\lambda$) frequency component at engine cycle frequency is greater than a second threshold magnitude (e.g., $Mag_\lambda > T2_{Mag}$). In one example, the second threshold magnitude may be a preset non-zero value. In one example, the second threshold may be a function of one or more parameters such as qualities of the sensor, engine speed, and/or engine load. In one example, the second threshold magnitude may be the same as or similar to the first threshold magnitude. If the magnitude of the air-fuel ratio ($\lambda$) frequency component is greater than the second threshold magnitude the method continues to 412 where the method determines that one cylinder pair is misfiring.

At 462, the method includes determining the phase of the air-fuel ratio ($\lambda$) frequency component at engine cycle frequency. The phase identifies which cylinder of the pair of cylinders is misfiring based on the orientation (on a polar plot) of the ($\lambda$) frequency component. For a pair of cylinders sharing a sensor, a misfire event at one of the cylinders only will cause the frequency component representation on a polar plot in a first orientation and the frequency component representation on a polar plot in an opposite, second orientation in an example where the other cylinder of the pair misfires only. In an example, the phase boundaries for cylinder identification are a function of exhaust transport delay and maybe adjusted based on engine speed, engine load, exhaust temperature, and pressure.

At 464, the method includes setting a misfire flag for the misfiring cylinder based on phase. In one example, the misfire flag may be a first diagnostic flag of three settings (e.g., pass, misfire, paired misfire). The misfire flag may include an indication that the sensor output for the pair of cylinders has been evaluated and the position of the misfiring cylinder.

The method continues to 474. At 474, the method includes updating the flag count. The controller may continuously update the flag count based on the one or more flags received during operation of the method 450. For example, the controller may maintain a log of the flags received during the operation of the method 450.

The method continues to 466. At 466, method determines whether the evaluated cylinder pair is the last cylinder pair. If yes, the method returns. If the evaluated cylinder pair is the not last cylinder pair, the method returns to 456 to evaluate the UEGO sensor signal for additional cylinder pairs.

Returning to 458, if the method determines the magnitude of the air-fuel ratio (λ) frequency component at engine cycle frequency is less than the second threshold magnitude (e.g., $Mag_\lambda < T2_{Mag}$), the method continues to 468. In one example, the second threshold magnitude may be a preset, non-zero magnitude. In one example, the second threshold magnitude may be the same or similar to the first threshold magnitude (e.g., in FIG. 4A).

At 468, the method includes determining if the average air-fuel ratio (λ) (e.g., λ averaged over one or more engine cycles) minus feedback correction is greater than a third threshold average difference (average $[\lambda-\lambda_{feedback\ corr.}] > T3_{\overline{\Delta\lambda}}$). In one example, the third threshold average difference may be a preset, non-zero threshold. In one example, the third threshold average difference may be the same or similar to the first threshold average difference (e.g., in FIG. 4A). If the average difference ($\lambda-\lambda_{feedback\ corr.}$) is greater than the third threshold average difference, the method continues to 470.

At 470, the method includes determining if the average air-fuel ratio (λ) minus feedback correction is greater than a fourth threshold average difference (average $[\lambda-\lambda_{feedback\ corr.}] > T4_{\overline{\Delta\lambda}}$). In one example, the fourth threshold average difference may be a preset, non-zero threshold. In one example, the fourth threshold average difference may be the same or similar to the second threshold average difference (e.g., in FIG. 4A). As an example, an average difference ($\lambda-\lambda_{feedback\ corr.}$) greater than a third threshold average difference but less than a fourth threshold average difference may indicate a single misfiring cylinder of a pair. If the average difference ($\lambda-\lambda_{feedback\ corr.}$) is less than a fourth threshold average difference, from 470 the method continues to 460. At 460, the method determines that one cylinder of the pair is misfiring and may identify the misfiring cylinder based on the phase of the air-fuel ratio frequency component at engine cycle frequency.

Returning to 470, if the method determines that the air-fuel ratio (λ) minus feedback correction is greater than a fourth threshold average difference, the method continues to 472.

At 472, the method includes setting a paired misfire flag for the misfiring cylinder pair. In one example, the paired misfire flag may be a second flag of three flag settings (e.g., pass, misfire, paired misfire). The misfire flag may include an indication that the sensor output for the pair of cylinders has been evaluated and the position of the misfiring cylinder pair. As an example, a misfire on both cylinders may produce a zero or near-zero oscillation, similar to a no misfire condition described below. However, the average air-fuel ratio (λ) (e.g., λ averaged over one or more engine cycles) minus feedback correction may saturate around the largest UEGO sensor reading. Thus, the magnitude and the average difference may be evaluated in tandem to determine paired misfires in cylinders sharing a UEGO sensor.

The method continues to 474. At 474, the method includes updating the flag count. The controller may continuously update the flag count based on the one or more flags received during operation of the method 450.

The method continues to 466. At 466, method determines whether the evaluated cylinder pair is the last cylinder pair. If yes, the method returns. If the evaluated cylinder pair is the not last cylinder pair, the method returns to 456 to evaluate the UEGO sensor signal for additional cylinder pairs.

Returning to 468, if the method determines that the average air-fuel ratio (λ) minus feedback correction is less than the third threshold average difference, the method continues to 476.

At 476, the method includes setting a pass flag for the cylinder pair. In one example, the pass flag may be a third flag of three settings (e.g., pass, single misfire, paired misfire). The pass flag may include an indication that the sensor output for the pair of cylinders has been evaluated and the position of the firing cylinder pair (e.g., no misfire). As an example, no misfire condition may produce a zero or near-zero air-fuel ratio oscillation, similar to a paired misfire condition. However, a no misfire condition produces an average air-fuel ratio (λ) value near one.

The method continues to 474. At 474, the method includes updating the flag count. The controller may continuously update the flag count based on the one or more flags received during operation of the method 450.

The method continues to 466. At 466, method determines whether the evaluated cylinder pair is the last cylinder pair. If yes, the method returns. If the evaluated cylinder pair is the not last cylinder pair, the method returns to 456 to evaluate the UEGO sensor signal for additional cylinder pairs.

FIG. 5 shows an example method 500 for misfire detection in opposite cylinder pairs. In one example, the method 500 may follow from method step 330 in FIG. 3 following a determination that the engine is a cross-plane crank V-8. In a flat-plane crank V8 engine, cylinders 360° apart in firing order may be on the same bank and may share the same UEGO sensor. In such examples, the method 400 may be suitable for detecting opposite paired misfire events. However, for a cross-plane crank V-8 engine (e.g., engine 250 of FIG. 2B), cylinders 360° apart in firing order (e.g., opposite cylinder pairs) may be on opposite banks and therefore may not share a sensor. In such examples, the method 500 may be executed to identify one or more opposite paired cylinder misfire events. Inputs to the method 500 may include the results of evaluating sensor signals for cylinder pairs. For example, inputs may include one or more flags received following the execution of the method 450 for detecting cylinder misfire in a cross-plane crank V-8 engine in FIG. 4B.

At 502, the method includes evaluating opposite pairs of cylinders not sharing a UEGO sensor. As an example, an opposite cylinder pair may comprise a first cylinder of a first pair of cylinders sharing a UEGO sensor and second cylinder of a second pair of cylinder sharing a second UEGO sensor, the first cylinder and second cylinder being 360° crank angle apart in firing order.

At 504, the method includes evaluating each opposite cylinder pair.

At 506, the method includes determining whether a misfire flag for the first cylinder is received. A misfire flag for the first cylinder may be received following a determination that the first cylinder is misfiring based on a higher than threshold magnitude and phase of the air-fuel ratio ($\lambda$) frequency component at the engine cycle frequency (e.g., step 464 in FIG. 4B). Alternatively, a paired misfire flag may be received based on a higher than threshold average air-fuel ratio ($\lambda$) (e.g., step 472 in FIG. 4B). If a first cylinder misfire flag is not received, the method continues to 508 where a pass flag may be set for the opposite cylinder pair. If a first cylinder misfire flag is received, the method continues to 512.

At 512, the method includes determining whether a misfire flag for the second cylinder is received. As one example, a misfire flag for the second cylinder may be received following a determination that the second cylinder is misfiring based on a higher than threshold magnitude and phase of an air-fuel ratio ($\lambda$) frequency component at the engine cycle frequency (e.g., step 464 in FIG. 4B). Alternatively, a paired misfire flag may be received based on a higher than average air-fuel ratio ($\lambda$) (e.g., step 472 in FIG. 4B). If a second cylinder misfire flag is not received, the method continues to 508 where a pass flag may be set for the opposite cylinder pair. In one example, the pass flag may indicate the pair has been evaluated and the misfire status (e.g., no paired misfire). If a second cylinder misfire flag is received, the method continues to 514.

At 514, the method includes setting a paired misfire flag for the opposite cylinder pair. As an example, the paired misfire flag may indicate the pair has been evaluated and the misfire status (e.g., paired misfire). A paired misfire flag may be generated only if the first cylinder of the first pair and second cylinder of the second pair have received misfire flags. From 514, the method continues to 510.

At 510, the method includes updating the flag count. The controller may continuously update the flag count based on the one or more flags received during operation of the method 500.

The method continues to 516. At 516, method determines whether the evaluated opposite pair is the last opposite pair. If yes, the method returns. If the evaluated opposite pair is the not last opposite pair, the method returns to 504 to evaluate additional opposite pairs.

In this way, in response to a higher than threshold crankshaft torsional vibration estimated based on crankshaft acceleration and the results of one or more cylinder misfire tests, such as illustrated by methods 400, 450 and/or 500, one or more misfire events may be detected and one or more misfiring cylinders identified. As such, degradation of engine and/or vehicle performance may be minimized when a cylinder bank is deactivated responsive to misfire due to issues such as ingestion of charge air cooler condensate by the engine.

FIG. 6A and FIG. 6B show a plot 600 and a plot 650, respectively, illustrating UEGO sensor outputs during cylinder firing and cylinder misfiring events. In the examples, the sensor output is an air-fuel ratio ($\lambda$) frequency component at cycle frequency for a pair of cylinders sharing a UEGO sensor (e.g., cylinder i and cylinder j). A magnitude of the air-fuel ratio ($\lambda$) frequency component at cycle frequency for a pair of cylinders sharing a UEGO sensor is illustrated in plot 600, which may be used to differentiate between cylinder firing and cylinder misfiring events. In addition to the magnitude of the sensor signal, the phase of the signal may be evaluated to identify a misfiring cylinder. Plot 650 illustrates magnitude and phase of an air-fuel ratio ($\lambda$) frequency component at cycle frequency for a pair of cylinders sharing an exhaust gas sensor.

Turning first FIG. 6A, plot 600 includes a misfire threshold magnitude 602 indicated by a dashed line. In one example, the misfire threshold magnitude 602 may be a preset, non-zero value. In one example, the misfire threshold magnitude 602 may be a function of one or more parameters including qualities of the sensor, engine speed, and engine load.

In the example plot 600, dots and triangles indicate a sensor signal sample point of a magnitude of the air-fuel ratio ($\lambda$) frequency component at cycle frequency. Each sample point of the magnitude corresponds to a computation performed over one engine cycle. For example, multiple $\lambda$ samples spanning one engine cycle may be used to compute the magnitude based on Fourier series coefficients of a cosine and sine functions at engine cycle frequency, the magnitude being the square root of sum of squares of the cosine and sine function coefficients. A misfire on the sensor monitoring exhaust produced by cylinder i and j causes the air-fuel ratio measurement to oscillate at the engine cycle frequency. The greater the magnitude of the oscillation, the further up vertically on the plot the dots and/or triangles will appear. Dots and/or triangles greater than the misfire threshold indicate misfire on either cylinder i or cylinder j. In one example, air-fuel ratio ($\lambda$) oscillation may be caused by the UEGO sensor sensing a lean pulse from one misfiring cylinder once every cycle.

Dots 604 on plot 600 are sensor readings lower than misfire threshold magnitude 602 indicating no misfire detected for cylinder i or cylinder j. For example, the magnitude of the air-fuel ratio ($\lambda$) frequency component for the plotted dots 604 may be zero or near zero.

Plotted triangles 606, 608 are sensor readings greater than the misfire threshold magnitude 602. Sensor readings greater than the misfire threshold magnitude 602 indicate an oscillation in $\lambda$ due to repeating lean shift in the air-fuel ratio, e.g., a misfire. A misfire on either cylinder i or cylinder j may be detected if the magnitude of the air-fuel ratio oscillation at cycle frequency exceeds the misfire threshold.

Turning now to FIG. 6B, a plot 650 is illustrated. Plot 650 shows both the magnitude and the phase of the air-fuel ratio ($\lambda$) frequency component at cycle frequency for firing and misfiring events for a pair of cylinders sharing a UEGO sensor. Plot 650 is a polar plot. Points plotted in the radially outward direction on plot 650 are equivalent to points plotted in the vertically upward direction on plot 600. Plot 650 includes a misfire threshold magnitude 652 indicated by a dashed line. In one example, misfire threshold magnitude 652 may be a preset, non-zero value. In one example, the value of threshold 652 in the radial direction is the same value as threshold 602 in the vertical direction. In one example, the misfire threshold magnitude 652 may be a function of one or more parameters including qualities of the sensor, engine speed, and engine load. If the magnitude of the air-fuel ratio ($\lambda$) frequency component at cycle frequency is outside the misfire threshold magnitude 652, e.g., greater in the radial direction, a cylinder misfire may be determined.

The phase, or angular direction, of the air-fuel ratio ($\lambda$) frequency component at cycle frequency may be used to identify the misfiring cylinder. In one example, the phase may be computed based on the direction or orientation of a vector formed by the Fourier coefficients of a cosine and a sine functions at engine cycle frequency (e.g., using inverse tangent function). Phase boundaries in plot 650 include a first phase lower boundary 654a, a first phase upper boundary 654b, a second phase lower boundary 656a, and a second phase upper boundary 656b. In one example, phase boundaries for cylinder identification may be a function of exhaust transport delay. In other words, the amount of time between when a pulse width of a fuel injector changes and a change in the air-fuel ratio may be measured. In some examples, exhaust transport delay may be a function of one or more variable parameters including engine speed, engine load, exhaust temperature, engine pressure, etc.

In the example plot 650, dots and triangles indicate a sensor output sample point of an air-fuel ratio ($\lambda$) frequency component at cycle frequency. A misfire on the sensor monitoring exhaust produced by cylinder i and j causes sensor signal to oscillate at the engine cycle frequency. In an example, the pair of cylinders i, j are expected to have opposite phase. For example, cylinder i should be $\pi$ (rad) or 1800 apart on average (or 360 crank-angle degrees) from cylinder j. The greater the magnitude of the oscillation, the further out radially on the plot the dots and/or triangles will appear. Sensor outputs greater than the misfire threshold 652 and between boundaries 654a and 654b indicate misfire on cylinder i. Sensor outputs greater than the misfire threshold magnitude 652 and between boundaries 656a and 656b indicate misfire on cylinder j. In one example, the oscillation may be caused by the UEGO sensor reading a lean pulse from one misfiring cylinder once every cycle.

Dots 658 on plot 650 are sensor outputs lower than misfire threshold magnitude 652 indicating no misfire detected for cylinder i or cylinder j. The magnitude of the sensor output for dots 658 is less than the misfire threshold magnitude 652, therefore a phase computation may be omitted. For example, the magnitude of the sensor outputs for the plotted dots 658 may be zero or near zero. In some examples, the magnitude of sensor output at or near zero may result from blowdown pulses from the firing cylinder.

Triangles 660, 662 are sensor outputs greater than the misfire threshold magnitude 652. Triangles 660 fall within the boundaries 654a, 654b and indicate misfire on the i cylinder. Triangles 662 fall within the boundaries 656a, 656b and indicate misfire on the j cylinder. In some examples, the phase of triangles 660, 662 may be observable due to the lean spikes from the misfiring cylinder superimposing a waveform on the UEGO sensor signal.

Turning now to FIG. 7, a plot 700 is illustrated showing example cylinder misfire detection for a pair of cylinders sharing a single exhaust gas sensor (e.g., a UEGO) and respective thresholds for the sensor signal. Cycle number is plotted on the x-axis and UEGO sensor air-fuel ratio ($\lambda$) signal minus feedback correction (e.g., $\lambda - \lambda_{feedback\ corr.}$) is plotted on the y-axis of plot 700. Values increase upwards along the y-axis and increase rightwards along the x-axis.

Dotted line 701 represents an air-fuel ratio ($\lambda$) signal at or near 1 (e.g., $\lambda - \lambda_{feedback\ corr.} = 1$). Values greater than 1 indicate a lean shift in the air-fuel ratio. A first threshold difference (e.g., $T1_{\overline{\Delta\lambda}}$ from method 400) is shown as a dotted line, herein named a first threshold difference 702. As an example, a pair of firing cylinders sharing a sensor may produce a sensor signal less than the first threshold difference 702. A second threshold difference 704 (e.g., $T2_{\overline{\Delta\lambda}}$ from method 400) is shown is shown as a dotted line. As an example, a misfire on both cylinders of a pair of cylinders sharing a sensor may produce a sensor output greater than the second threshold difference 704. A misfire on one but not both of a pair of cylinders sharing a sensor may produce a sensor output greater than the first threshold difference 702 and less than the second threshold difference 704. Dashed lines 710, 712 indicate a magnitude of the air-fuel ratio ($\lambda$) frequency component. Dashed lines 710 represent an output less than a first threshold magnitude (e.g., $T1_{Mag}$ from method 400). Dashed lines 710 are shown representing zero or near-zero $\lambda$ oscillation at cycle frequency. Dashed lines 712 represent an output greater than the first threshold magnitude. Dashed lines 712 are shown representing a large $\lambda$ oscillation at cycle frequency.

An output 706 is produced by the UEGO sensor from cycles 0 through 3. Output 706 may be produced when both cylinders of a pair of cylinders sharing a sensor are firing. As an example, when both cylinders of a pair are firing the air-fuel ratio ($\lambda$) signal may be at or near dotted line 701 (e.g., near 1). Additionally, the magnitude of the air-fuel ratio ($\lambda$) frequency component may be less than the first threshold magnitude, as indicated by dashed lines 710. Firing cylinders may produce none to very minimal oscillation due to the minimal or absent lean pulse (repeating every cycle).

An output 708 is produced by the UEGO sensor from cycles 4 through 7. Output 708 may be produced when one cylinder of the pair of cylinders sharing the sensor is firing and one cylinder of the pair is misfiring. As an example, when only one cylinders of the pair is misfiring, the air-fuel ratio shifts lean once per cycle, producing the oscillation at cycle frequency. The magnitude of the air-fuel ratio ($\lambda$) frequency component is greater than the first threshold magnitude, as indicated by dashed lines 712. The average air-fuel ratio ($\lambda$) minus feedback correction, indicated by dashed line 714, is greater than the first threshold difference 702, indicating a single misfiring cylinder. Phase 716 is in a first orientation, indicating a misfire on cylinder i (peak of the $\lambda$ oscillation is near the beginning of each cycle).

An outputs 709 is produced by the UEGO sensor from cycles 8 through 11. Output 709 may be produced when one cylinder of the pair of cylinders sharing the sensor is firing and one cylinder of the pair is misfiring. A misfire may cause a lean shift, but closed-loop fuel feedback can reduce or eliminate the (average) lean shift. For this reason, the average air-fuel ratio ($\lambda$) minus feedback correction may be used instead of the average air-fuel ratio ($\lambda$). In this example, the magnitude of the air-fuel ratio ($\lambda$) frequency component is greater than the first threshold magnitude, as indicated by dashed lines 712. The average air-fuel ratio ($\lambda$) minus feedback correction, indicated by dashed line 715, is greater than the first threshold difference 702. Thus, both parameters indicate a single misfiring cylinder. Phase 718 is in a second orientation, indicating a misfire on cylinder j (peak of the $\lambda$ oscillation is near the middle of each cycle). An output 711 is produced by the UEGO sensor from cycles 12 through 15. Output 711 may be produced when both cylinders of a pair of cylinders sharing a sensor are misfiring. For a pair of misfiring cylinders, the magnitude of the air-fuel ratio ($\lambda$) frequency component may be less than the first threshold magnitude, as indicated by dashed lines 710. However, the average air-fuel ratio ($\lambda$) minus feedback correction may be greater than the second threshold difference. In an example, a pair of misfiring cylinders may produce an average output near the largest (or maximum) UEGO sensor reading. The magnitude of output 711 is less than the threshold magnitude and the average air-fuel ratio (λ) minus feedback correction is greater than the second threshold difference, indicating misfire on cylinder i and j.

In this way, plots 600, 650, and 700 illustrate exhaust gas oxygen sensor outputs and output thresholds, and a method for differentiating between sensor outputs based on the magnitude and phase of the air-fuel ratio frequency component at cycle frequency. In some examples, the methods described herein, such as in FIGS. 3, 4A, 4B, and 5 may rely on similar differentiation strategies and thresholds such as described in FIGS. 6A, 6B, and 7 to detect and identify misfiring cylinders.

FIG. 8 shows an example timing diagram 800 for prophetic operation of a method to identify cylinder misfire in an engine system based on a UEGO sensor output and an engine firing order. As one example, the engine system may be the same or similar as the engine system 100 of FIG. 1. The engine system may include a flat-plane crank V-8 engine, such as engine 200 of FIG. 2A. In other examples, the engine system may include a cross-plane crank V-8 engine, such as engine 250 of FIG. 2B. The control routines illustrated in FIG. 8 may be executed by a control system using sensor feedback, such as the control system 14, crankshaft position sensor 126, and UEGO sensors 212, 214, 216, 218, described in FIGS. 1-2. Instructions for performing misfire detection described in the timing diagram 800 may be executed by the controller (e.g., controller 12 in FIG. 1-2) based on instructions stored on a memory of the controller and in conjunction with signals received from the sensors of the vehicle system, such as described FIGS. 1-2. The horizontal (x-axis) denotes time and the vertical markers t0-t5 identify significant times in cylinder misfire detection.

Timing diagram 800 shows plots 802, 804, 806, 808, and 810, which illustrate sensor outputs and/or operating conditions of the engine system over time. The first plot from the top, plot 802, shows crankshaft torsional vibrations as estimated by a crankshaft acceleration sensor. Dotted line 803 shows a threshold for crankshaft torsional vibration. In one example, crankshaft torsional vibration threshold may be a preset, non-zero threshold vibration (e.g., 500 rad/s$^2$, between 100 to 1000 rad/s$^2$). The threshold vibration may be a function of load, speed, rotational-inertial, and/or crankshaft rotational frequencies. In one example, the signal may be normalized and/or filtered and therefore unitless and/or with a different range of values. The second plot, plot 804 shows a magnitude of an air-fuel ratio (λ) frequency component at cycle frequency as estimated by a UEGO sensor monitoring a pair of cylinders (e.g., first UEGO sensor 212 monitoring cylinder 1 and cylinder 3 in FIG. 2A). A first threshold magnitude 812 is shown as a dotted line. In one example, the first threshold magnitude may be a preset, non-zero threshold magnitude (e.g., Magλ>0.5). The third plot, plot 806, shows an average air-fuel ratio (λ) minus feedback correction as estimated from a UEGO sensor monitoring a pair of cylinders. A first threshold difference 814 (e.g., $T1_{\overline{\Delta\lambda}}$ from method 400) is shown as a dotted line. A second threshold difference 816 (e.g., $T2_{\overline{\Delta\lambda}}$ from method 400) is shown as a dotted line. In one example, the first and second threshold differences may be preset, non-zero threshold frequencies (e.g., 1.5 and 2, respectively). The fourth plot, plot 808, shows a phase of the air-fuel ratio (λ) frequency component at cycle frequency as estimated from a UEGO sensor monitoring a pair of cylinders. First boundary upper threshold 820 and first boundary lower threshold 822 delineate a first phase. Second boundary upper threshold 824 and second boundary lower threshold 826 delineate a second, oppositely oriented, phase. As an example, the first phase may include sensor signals between 200 and 70° (e.g., see FIG. 6B). Sensor signals detected within the limits of the first phase indicate a first cylinder misfire. The second phase may include sensor signals between 200° and 250°. Sensor signals detected within the limits of the second phase indicate a second cylinder misfire. The fifth plot, plot 810, shows a flag setting for the engine system with the following values: pass (P), a misfire on one cylinder of the pair (1), or a paired misfire (2). Flags may be set based on the sensor outputs of plots 802, 804, 806, and 808.

Prior to time t1, the engine operates with all cylinders in the cylinder bank in an active state with lower than threshold crankshaft torsional vibrations. For the crankshaft torsional vibrations, the magnitude of the peaks/valleys of each nominal vibration may be fairly stable for a given engine speed and engine load. The vibrational amplitude for a given engine speed and load may be consistent and repeatable. During this time, crankshaft torsional vibrations, based on engine speed are below the threshold level indicating scheduled combustion in the engine cylinders.

At time t1, a higher than threshold variation in crankshaft torsional vibrations may be detected by the crankshaft acceleration sensor, indicating a possibility of a cylinder misfire event. In order to confirm the indication of the misfire event, UEGO sensor output may be estimated following time t1.

Between time t1 and t2, the UEGO sensor samples exhaust gas produced by the pair of cylinders. For the duration of the sensor sampling, line 804 shows the magnitude of the air-fuel ratio (λ) frequency component at cycle frequency (e.g., Mag λ=0.02) remains less than the threshold 812 (e.g., $T1_{Mag}$=0.5). UEGO sensor output magnitude less than the threshold magnitude may indicate no misfire or misfiring at both cylinders of the pair. Line 806 shows the average air-fuel ratio (λ) minus feedback correction remains less than the first threshold difference 814, indicating no misfire. Line 808 shows the frequency phase falls outside the boundaries of the first phase and the second phase, in this case because the oscillation is effectively zero. Based on the sensor output a pass flag (P) is set for the pair of cylinders.

At time t2, higher than threshold variation in crankshaft torsional vibrations may be detected by the crankshaft acceleration sensor, indicating a possibility of a cylinder misfire event.

In order to confirm the indication of the misfire event, UEGO sensor output may be estimated following time t2.

Between time t2 and t3, the UEGO sensor samples exhaust gas produced by the pair of cylinders. For the duration of the sensor sampling, line 804 shows the magnitude of the air-fuel ratio (λ) frequency component at cycle frequency (e.g., Mag λ=0.8) is greater than the threshold 812 (e.g., $T1_{Mag}$=0.5), indicating a single cylinder misfire. Line 806 shows the average λ minus feedback correction is greater than the first threshold difference 814 and less than the second threshold difference 816, further indicating a single cylinder misfire. Line 808 shows the phase of the UEGO sensor signal falls within the limits of the first phase (e.g., phase=25°), in this case due to the lean shift (repeating once per cycle) causing the sensor signal to oscillate. Based on the sensor output a misfire flag (1) is set for the first cylinder of the pair.

Subsequently, at time t3, higher than threshold variation in crankshaft torsional vibrations may be detected by the crankshaft acceleration sensor, indicating a possibility of a cylinder misfire event. In order to confirm the indication of the misfire event, UEGO sensor output may be estimated following time t3.

Between time t3 and t4, the UEGO sensor samples exhaust gas produced by the pair of cylinders. For the duration of the sensor sampling, line 804 shows the magnitude of the air-fuel ratio (λ) frequency component at cycle frequency (e.g., Mag λ=0.9) is greater than the threshold 812 (e.g., $T1_{Mag}$=0.5), indicating a single cylinder misfire. Line 806 shows the average λ minus feedback correction is greater than the first threshold difference 814 and less than the second threshold difference 816, further indicating a single cylinder misfire. Line 808 shows the phase of the UEGO sensor signal falls within the limits of the second phase (e.g., phase=205°), once more due to the lean shift (repeating once per cycle) causing the sensor signal to oscillate. Based on the sensor output a misfire flag (1) is set for the second cylinder of the pair.

At time t4, once again a higher than threshold variation in crankshaft torsional vibrations may be detected by the crankshaft acceleration sensor, indicating a possibility of a cylinder misfire event. In order to confirm the indication of the misfire event, UEGO sensor output may be estimated following time t4.

Between time t4 and t5, the UEGO sensor samples exhaust gas produced by the pair of cylinders. For the duration of the sensor sampling, line 804 shows the magnitude of the air-fuel ratio (λ) frequency component at cycle frequency (e.g., Mag λ=0.01) remains less than the threshold 812 (e.g., $T1_{Mag}$=0.5), indicating no misfire or a misfiring at both cylinders. Line 806 shows the average λ minus feedback correction is greater than the second threshold difference 816, indicating a misfire at both cylinders. Line 808 shows the frequency phase falls outside the boundaries of the first phase and the second phase. Based on the sensor output a paired misfire flag (2) is set for the pair of cylinders.

As an example, following the execution of the methods described herein, e.g., methods 300, 400, 450, and 500 of FIGS. 3,4A, 4B and 5, respectively, and illustrated in the timing diagram 800 of FIG. 8, diagnostic flags may be retrieved by a technician. The diagnostic flags may be used by the technician to inform additional tests or repair strategies. As another example, diagnostic flags may be communicated via a network to a display for an operator and/or technician. The diagnostic flags may be used to adjust vehicle operation, for example.

In this way, based on a higher than threshold crankshaft torsional vibration and an evaluation of exhaust gas sensor output, cylinder misfire may be carried out reliably for an engine system with many cylinders, such as 8 cylinder or greater V-engines. By monitoring the output of a plurality of exhaust gas oxygen sensors, each UEGO sensor arranged to monitor a pair of cylinders only, the signal to noise ratio is increased while balancing cost and complexity. Exhaust gas oxygen sensors monitoring a pair of cylinders may produce a signal of sufficient strength and sampling rate to distinguish between firing and misfiring cylinders. By utilizing exhaust flow characteristics such as valve opening timing, transport delay time, and higher frequency content impose upon average UEGO signal, one or more individual misfiring cylinders may be identified. The technical effect of increasing the reliability of misfire detection in many-cylinder engines is that cylinder misfire is diagnosed, unnecessary cylinder deactivation is reduced, thereby improving engine performance.

The disclosure also provides support for a system for an engine, comprising: a first cylinder and second cylinder of the engine having exhaust flows combined together in an exhaust system before being combined with other cylinders of the engine, an exhaust gas sensor mounted in the exhaust system in a position to sense exhaust from the first cylinder and second cylinder, and being positioned before exhaust from other cylinders is combined with sensed exhaust from the first cylinder and second cylinder, and a control system with instructions stored therein to indicate detected misfire in one or more of the first cylinder and the second cylinder based on an output from the exhaust gas sensor. In a first example of the system, the control system further includes instructions to detect misfire of one or more of the first cylinder and second cylinder based on a magnitude of the output of the exhaust gas sensor, and then identify which of the first cylinder and second cylinder is misfiring based on a phase of the output of the exhaust gas sensor relative to a firing order of the engine. In a second example of the system, optionally including the first example, the system further comprises: a third cylinder and a fourth cylinder of the engine having exhaust flows combined together in the exhaust system before being combined with other cylinders of the engine, a second exhaust gas sensor mounted in the exhaust in a second position to sense exhaust from the third cylinder and fourth cylinder, and being positioned before exhaust from other cylinders is combined with sensed exhaust from the third cylinder and fourth cylinder. In a third example of the system, optionally including one or both of the first and second examples, the control system further includes instructions to detect misfire of one or more of the third cylinder and fourth cylinder based on the magnitude of the output of the second exhaust gas sensor, and then identify which of the third cylinder and fourth cylinder is misfiring based on the phase of the output of the second exhaust gas sensor relative to the firing order of the engine. In a fourth example of the system, optionally including one or more or each of the first through third examples, the control system further includes instructions to detect opposite paired misfire of exactly two cylinders of the first cylinder, second cylinder, third cylinder, and fourth cylinder based on the output of the exhaust gas sensor and the output of the second exhaust gas sensor. In a fifth example of the system, optionally including one or more or each of the first through fourth examples, the control system further includes instructions to generate a first flag based on detection of no misfire, a second flag based on detection of a single cylinder misfire, and a third flag based on detection of a paired cylinder misfire, the first flag, the second flag, and the third flag including a position and a misfire status of one or more cylinders.

The disclosure also provides support for a method for misfire detection and cylinder identification, comprising: grouping only a first pair of cylinders and only a second pair of cylinders, each with separate oxygen sensors, and identifying a cylinder with misfire based on the separate oxygen sensors and an engine firing order. In a first example of the method, the grouped cylinders always have another cylinder firing between them in the engine firing order. In a second example of the method, optionally including the first example, the identifying of the cylinder with misfire is based on a magnitude and a phase of the separate oxygen sensors. In a third example of the method, optionally including one or both of the first and second examples, the identifying of the cylinder with misfire is further based on engine crankshaft fluctuations. In a fourth example of the method, optionally including one or more or each of the first through third examples, the method further comprises: identifying opposite paired cylinder misfire where two cylinders are each misfiring in the engine firing order based on the separate oxygen sensors. In a fifth example of the method, optionally including one or more or each of the first through fourth examples, the method further comprises: adjusting a sampling rate of the separate oxygen sensors based on the magnitude or phase.

The disclosure also provides support for a system for an engine, comprising: only a first cylinder and second cylinder of the engine having exhaust flows combined together in a first exhaust passage before being combined with other cylinders of the engine, an exhaust gas sensor mounted in the first exhaust passage in a position to sense exhaust from only the first cylinder and second cylinder, and being positioned before exhaust from other cylinders is combined with sensed exhaust from the first cylinder and second cylinder, and a control system with instructions stored therein to indicate detected misfire in one or more of the first cylinder and the second cylinder based on an output from the exhaust gas sensor, and to detect misfire of one or more of the first cylinder and second cylinder based on a magnitude of the output of the exhaust gas sensor, and then identify which of the first cylinder and second cylinder is misfiring based on a phase of the output of the exhaust gas sensor relative to a firing order of the engine. In a first example of the system, the system further comprises: only a third cylinder and a fourth cylinder of the engine having exhaust flows combined together in a second exhaust passage before being combined with other cylinders of the engine, a second exhaust gas sensor mounted in the second exhaust passage in a second position to sense only exhaust from the third cylinder and fourth cylinder, and being positioned before exhaust from other cylinders is combined with sensed exhaust from the third cylinder and fourth cylinder, wherein the control system further includes instructions to detect misfire of one or more of the third cylinder and fourth cylinder based on the magnitude of the output of the second exhaust gas sensor, and then identify which of the third cylinder and fourth cylinder is misfiring based on the phase of the output of the second exhaust gas sensor relative to the firing order of the engine. In a second example of the system, optionally including the first example, the control system further includes instructions to detect opposite paired misfire of exactly two cylinders of the first cylinder, second cylinder, third cylinder, and fourth cylinder based on the output of the exhaust gas sensor and the output of the second exhaust gas sensor. In a third example of the system, optionally including one or both of the first and second examples, the control system further includes instructions to generate a first flag based on detection of no misfire, a second flag based on detection of a single cylinder misfire, and a third flag based on detection of a paired cylinder misfire, the first flag, the second flag, and the third flag including a position and a misfire status of one or more cylinders. In a fourth example of the system, optionally including one or more or each of the first through third examples, the system further comprises: detecting misfire based on crankshaft acceleration. In a fifth example of the system, optionally including one or more or each of the first through fourth examples, the exhaust gas sensor is a UEGO sensor. In a sixth example of the system, optionally including one or more or each of the first through fifth examples, the second exhaust gas sensor is a UEGO sensor. In a seventh example of the system, optionally including one or more or each of the first through sixth examples, the engine is a flat-plane crank V-8 engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine, comprising:
a first cylinder and a second cylinder of a four-cylinder bank of the engine having exhaust flows combined together in an exhaust system of the engine before being combined with exhaust from a third cylinder and a fourth cylinder of the four-cylinder bank of the engine;
an exhaust gas sensor mounted in the exhaust system in a position to sense exhaust from the first cylinder and the second cylinder, and being positioned before exhaust from the third cylinder and the fourth cylinder is combined with the sensed exhaust from the first cylinder and the second cylinder, the exhaust from the third cylinder and the fourth cylinder combining with the combined exhaust from the first cylinder and the second cylinder in the exhaust system of the engine downstream of the exhaust gas sensor; and
a control system with memory and instructions stored in the memory to indicate detected misfire in one or more of the first cylinder and the second cylinder based on a magnitude of a frequency component of an output from the exhaust gas sensor at engine cycle frequency, and then, after indicating detected misfire, identify which cylinder is misfiring based on a phase of the frequency component of the output from the exhaust gas sensor at the engine cycle frequency.

2. The system of claim 1, wherein identifying which of the first cylinder and the second cylinder is misfiring is based on the phase of the frequency component of the output from the exhaust gas sensor at the engine cycle frequency relative to a firing order of the engine.

3. The system of claim 2, further comprising:
a second exhaust gas sensor mounted in the exhaust system in a second position to sense the exhaust from the third cylinder and the fourth cylinder, and being positioned before the combined exhaust from the first cylinder and the second cylinder is combined with the sensed exhaust from the third cylinder and the fourth cylinder.

4. The system of claim 3, wherein the control system further includes instructions to detect misfire of one or more of the third cylinder and the fourth cylinder based on a magnitude of a frequency component of an output of the second exhaust gas sensor, and then identify which of the third cylinder and the fourth cylinder is misfiring based on a phase of the frequency component of the output of the second exhaust gas sensor relative to the firing order of the engine.

5. The system of claim 4, wherein the control system further includes instructions to detect opposite paired misfire of exactly two cylinders of the first cylinder, the second cylinder, the third cylinder, and the fourth cylinder based on the output of the first exhaust gas sensor and the output of the second exhaust gas sensor.

6. The system of claim 5, wherein the control system further includes instructions to generate a first flag based on detection of no misfire, a second flag based on detection of a single cylinder misfire, and a third flag based on detection of a paired cylinder misfire, the first flag, the second flag, and the third flag including a position and a misfire status of one or more cylinders.

7. The system of claim 1, wherein the instructions further comprise:
in response to the magnitude of the frequency component of the output of the exhaust gas sensor at engine cycle frequency being above a first threshold, indicating one cylinder is misfiring; and
in response to the magnitude of the frequency component of the output of the exhaust gas sensor at engine cycle frequency being below the first threshold, determining if an average difference between an air-fuel ratio and a feedback correction is greater than a first threshold average difference, and, then, indicating no cylinder misfire if the average difference is less than the first threshold average difference, and determining if paired misfired occurred if the average difference is greater than the first threshold average difference.

8. A system, comprising:
an engine having a first pair of cylinders and a second pair of cylinders on an engine bank, each pair with separate oxygen sensors, where exhaust from the first pair of cylinders is grouped with exhaust from the second pair of cylinders only after the exhaust from the first pair of cylinders and the exhaust from the second pair of cylinders are sensed by the separate oxygen sensors, wherein the separate oxygen sensors include a first exhaust gas sensor and a second exhaust gas sensor; and
a control system with memory and instruction stored in the memory for misfire detection and cylinder identification, including instructions for detecting a cylinder with misfire based on a magnitude of a frequency component of the output from the separate oxygen sensors at an engine cycle frequency and then, after detecting the cylinder with misfire, identifying the cylinder with misfire based on a phase of the frequency component of an output from the separate oxygen sensors at the engine cycle frequency during misfire.

9. The system of claim 8, wherein the first pair of cylinders and the second pair of cylinders always have another cylinder firing between them in the engine firing order.

10. The system of claim 8, wherein the identifying of the cylinder with misfire is further based on engine crankshaft fluctuations.

11. The system of claim 10, wherein the instructions further comprise identifying opposite paired cylinder misfire where two cylinders are each misfiring in the engine firing order based on the separate oxygen sensors.

12. The system of claim 11, wherein the instructions further comprise adjusting a first sampling rate of the first exhaust gas sensor of the separate oxygen sensors based on a magnitude and a phase of the frequency component of an output from the first exhaust gas sensor at engine cycle frequency.

13. A system, comprising:
an engine having a first cylinder and a second cylinder of a bank of the engine, where only exhaust flows from the first cylinder and from the second cylinder are combined together in a first exhaust passage before being combined with exhaust from a third cylinder and a fourth cylinder of the bank of the engine;
an exhaust gas sensor mounted in the first exhaust passage in a position to sense exhaust from only the first cylinder and the second cylinder, and being positioned before the exhaust from the third cylinder and the fourth cylinder is combined with the sensed exhaust from the first cylinder and the second cylinder, the exhaust from the third cylinder and the fourth cylinder combining with the combined exhaust flows from the first cylinder and the second cylinder in an exhaust system of the engine downstream of the exhaust gas sensor; and
a control system with memory and instructions stored in the memory to indicate detected misfire in one or more of the first cylinder and the second cylinder based on a magnitude of a frequency component of an output from the exhaust gas sensor at an engine cycle frequency, and then, after detected misfire is indicated, identify which of the first cylinder and the second cylinder is misfiring based on a phase of the frequency component of the output of the exhaust gas sensor relative to a firing order of the engine.

14. The system of claim 13, wherein:
the third cylinder and the fourth cylinder of the engine have exhaust flows combined together in a second exhaust passage before being combined with the combined exhaust flows from the first cylinder and the second cylinder;
a second exhaust gas sensor mounted in the second exhaust passage in a second position to sense only exhaust from the third cylinder and the fourth cylinder, and being positioned before the sensed exhaust from the first cylinder and the second cylinder is combined with the sensed exhaust from the third cylinder and the fourth cylinder, wherein the control system further includes instructions to detect misfire of one or more of the third cylinder and the fourth cylinder based on a magnitude of a frequency component of an output from the second exhaust gas sensor at the engine cycle frequency, and then identify which of the third cylinder and the fourth cylinder is misfiring based on the phase of the frequency component of the output of the second exhaust gas sensor relative to the firing order of the engine.

15. The system of claim 14, wherein the control system further includes instructions to detect opposite paired misfire of exactly two cylinders of the first cylinder, the second cylinder, the third cylinder, and the fourth cylinder based on the output of the exhaust gas sensor and the output of the second exhaust gas sensor, the opposite paired misfire being 360 crank-angle degrees apart on average.

16. The system of claim 15, wherein the control system further includes instructions to generate a first flag based on detection of no misfire, a second flag based on detection of a single cylinder misfire, and a third flag based on detection of a paired cylinder misfire, the first flag, the second flag, and the third flag including a position and a misfire status of one or more cylinders.

17. The system of claim 15, wherein the instructions further comprise detecting misfire based on crankshaft acceleration.

18. The system of claim 15, wherein the exhaust gas sensor is a UEGO sensor.

19. The system of claim 15, wherein the second exhaust gas sensor is a UEGO sensor.

20. The system of claim 15, wherein the engine is a flat-plane crank V-8 engine.

* * * * *